United States Patent
Iwata et al.

(10) Patent No.: US 11,159,777 B2
(45) Date of Patent: Oct. 26, 2021

(54) IMAGE DISPLAY SYSTEM, NON-TRANSITORY STORAGE MEDIUM HAVING STORED THEREIN IMAGE DISPLAY PROGRAM, IMAGE DISPLAY APPARATUS, AND IMAGE DISPLAY METHOD

(71) Applicant: NINTENDO CO., LTD., Kyoto (JP)

(72) Inventors: Kenji Iwata, Kyoto (JP); Ryuhei Matsuura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 16/807,452

(22) Filed: Mar. 3, 2020

(65) Prior Publication Data
US 2020/0304770 A1    Sep. 24, 2020

(30) Foreign Application Priority Data
Mar. 20, 2019   (JP) .............................. JP2019-053701

(51) Int. Cl.
*H04N 13/128*  (2018.01)
*H04N 13/117*  (2018.01)
(Continued)

(52) U.S. Cl.
CPC .......... *H04N 13/128* (2018.05); *G06F 3/012* (2013.01); *H04N 13/117* (2018.05); *H04N 13/275* (2018.05); *H04N 13/344* (2018.05)

(58) Field of Classification Search
CPC .. G06T 19/006; G06T 19/003; G06F 2111/18; G06F 3/011
See application file for complete search history.

(56) References Cited

U.S. PATENT DOCUMENTS 5,420,414 A * 5/1995 Wentworth .............. G02B 6/06
                                                     250/214 VT
6,304,267 B1 * 10/2001 Sata ........................ G06T 15/10
                                                         345/419
(Continued)

FOREIGN PATENT DOCUMENTS

JP    2014-135771    7/2014
WO    2019/043025    3/2019

OTHER PUBLICATIONS

Ajoy S Fernandes et al, "Combating VR sickness through subtle dynamic field-of-view modification", 2016 IEEE Symposium on 3D User Interfaces (3DUI), Mar. 1, 2016, pp. 201-210, XP055439351, DOI: 10.1109/3DUI.2016.7460053, ISBN: 978-1-5090-0842-1.
(Continued)

*Primary Examiner* — Clifford Hilaire
(74) *Attorney, Agent, or Firm* — Nixon & Vanderhye, P.C.

(57) ABSTRACT

An example of an image display system includes a goggles apparatus and is capable of setting an angle of view of a virtual camera to a first angle of view or a second angle of view smaller than the first angle of view. If the angle of view of the virtual camera is set to the second angle of view, the image display system generates an image for a left eye and an image for a right eye in each of which a part of the virtual space is enlarged, and displays the enlarged images for a left eye and for a right eye on a display of the goggles apparatus such that display areas of the enlarged images for a left eye and for a right eye are smaller than display areas if the angle of view of the virtual camera is set to the first angle of view.

20 Claims, 20 Drawing Sheets

THIRD ANGLE OF VIEW B (45 DEGREES)

LEFT DISPLAY AREA AT FIRST ANGLE OF VIEW

LEFT DISPLAY AREA AT ANGLE OF VIEW B

(51) Int. Cl.
    *H04N 13/344*     (2018.01)
    *H04N 13/275*     (2018.01)
    *G06F 3/01*     (2006.01)

(56) References Cited

U.S. PATENT DOCUMENTS

| | | | |
|---|---|---|---|
| 2012/0169717 A1* | 7/2012 | Nakano | A63F 13/5252 |
| | | | 345/419 |
| 2015/0163475 A1 | 6/2015 | Krisman | |
| 2015/0352437 A1* | 12/2015 | Koseki | G06F 3/011 |
| | | | 463/31 |
| 2016/0219262 A1 | 7/2016 | Cole et al. | |

OTHER PUBLICATIONS

Huiwen Chang et al, "Panning and Zooming High-Resolution Panoramas in Virtual Reality Devices", Proceedings of the 30th Annual ACM Symposium on User Interface Software and Technology, UIST'17, Oct. 22, 2016, pp. 279-288, XP055421218, New York, USA, DOI: 10.1145/3126594.3126617, ISBN: 978-1-4503-4981-9.

Extended European Search Report dated Jun. 16, 2020 in corresponding European Application No. 20162658.7, 11 pages.

\* cited by examiner

LEFT DISPLAY AREA | RIGHT DISPLAY AREA
NON-VIEWING AREA

THIRD ANGLE OF VIEW C (35 DEGREES)

LEFT DISPLAY AREA AT FIRST ANGLE OF VIEW

LEFT DISPLAY AREA AT ANGLE OF VIEW C

SECOND ANGLE OF VIEW (30 DEGREES)

LEFT DISPLAY AREA AT FIRST ANGLE OF VIEW

LEFT DISPLAY AREA AT SECOND ANGLE OF VIEW

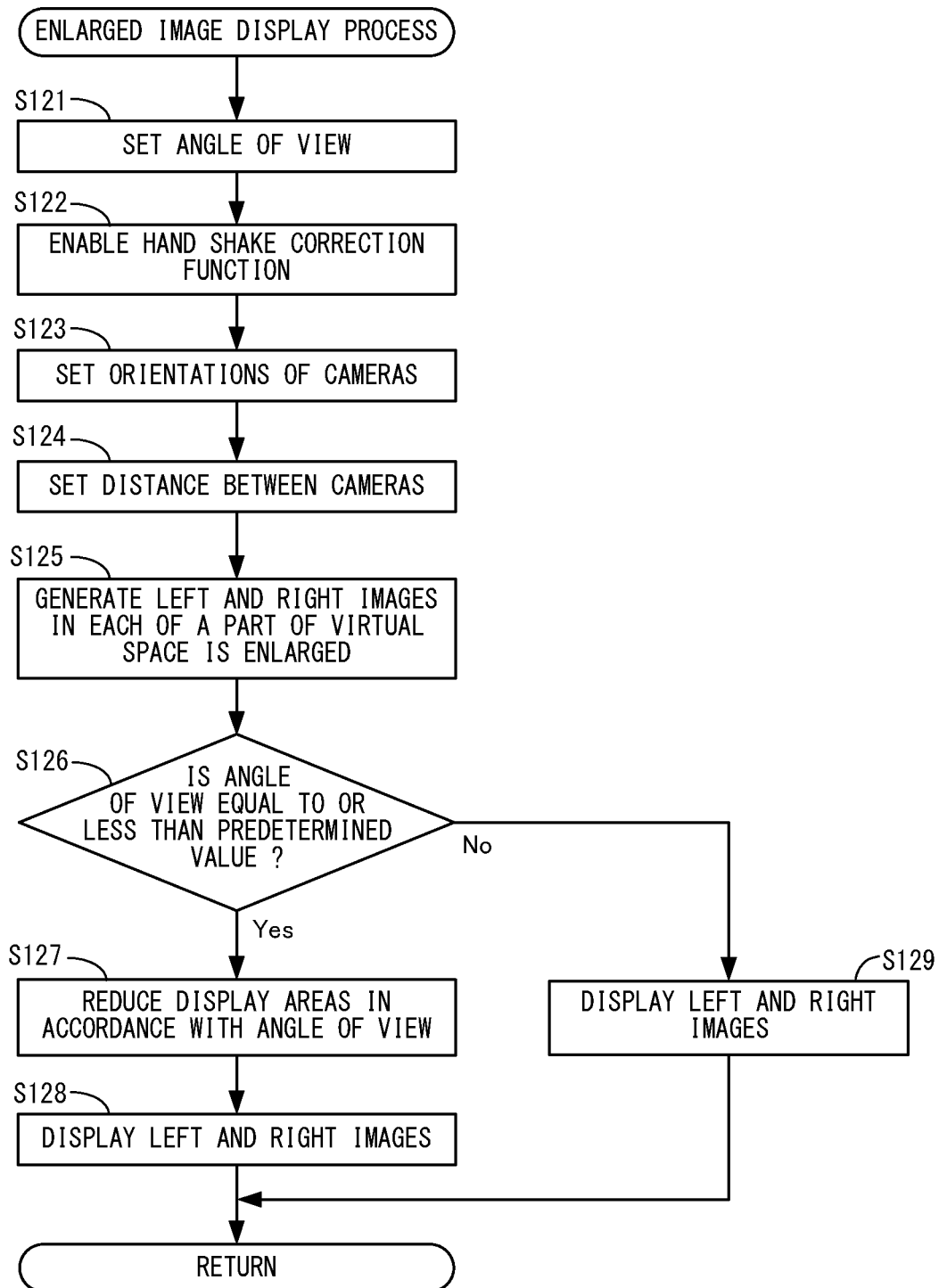

… (1) …

IMAGE DISPLAY SYSTEM, NON-TRANSITORY STORAGE MEDIUM HAVING STORED THEREIN IMAGE DISPLAY PROGRAM, IMAGE DISPLAY APPARATUS, AND IMAGE DISPLAY METHOD

CROSS REFERENCE TO RELATED APPLICATION

The disclosures of Japanese Patent Application No. 2019-053701, filed on Mar. 20, 2019, are incorporated herein by reference.

FIELD

The exemplary embodiments herein relate to an image display system, a non-transitory storage medium having stored therein an image display program, an image display apparatus, and an image display method that are capable of displaying a stereoscopic image.

BACKGROUND AND SUMMARY

As related art, there is a display control system that causes a user to view a stereoscopic image by disposing a virtual camera in a virtual space, generating an image for a left eye and an image for a right eye on the basis of the virtual camera, and allowing the user to view the image for a left eye and the image for a right eye with their left eye and right eye, respectively.

However, there is room for improvement in reducing the possibility of virtual reality (VR) sickness in the case of allowing a user to view a stereoscopic image using a goggles apparatus to experience VR.

Therefore, an object of the exemplary embodiments is to provide an image display system, a non-transitory storage medium having stored therein an image display program, an image display apparatus, and an image display method that are capable of reducing the possibility of VR sickness.

To achieve the above object, the exemplary embodiments employs the following configurations.

An image display system according to an exemplary embodiment includes a goggles apparatus and at least one processor. The at least one processor is configured to: dispose a virtual camera in a virtual space; set an angle of view of the virtual camera to at least either one of a first angle of view and a second angle of view smaller than the first angle of view; generate an image for a left eye and an image for a right eye that are images of the virtual space included within the angle of view of the virtual camera and that have a parallax therebetween; and display the image for a left eye and the image for a right eye on a display section of the goggles apparatus. The at least one processor is configured to: generate a first image for a left eye and a first image for a right eye that represent a part of the virtual space, if the angle of view of the virtual camera is set to the first angle of view; and generate a second image for a left eye and a second image for a right eye in each of which a part of the virtual space is enlarged, if the angle of view of the virtual camera is set to the second angle of view. The at least one processor is configured to: display each of the first image for a left eye and the first image for a right eye in a display area with a first size, if the angle of view of the virtual camera is set to the first angle of view; and display each of the second image for a left eye and the second image for a right eye in a display area with a second size smaller than the first size, if the angle of view of the virtual camera is set to the second angle of view.

According to the above, a part of the virtual space can be enlarged and displayed by setting the angle of view of the virtual camera to the second angle of view. When an image for a left eye and an image for a right eye in each of which a part of the virtual space is enlarged are displayed, the display areas of the image for a left eye and the image for a right are reduced. If the enlarged image for a left eye and image for a right eye are displayed with a normal size and these images are seen, these images look different from those at normal time, which may cause VR sickness. However, the possibility of VR sickness can be reduced by reducing the display areas of the enlarged image for a left eye and image for a right eye.

The display area with the second size may be an area having a shape substantially similar to that of the display area with the first size.

According to the above, even if the angle of view of the virtual camera is set to the second angle of view, an image for a left eye and an image for a right eye that have shapes substantially similar to those when the angle of view of the virtual camera is set to the first angle of view. Thus, when a part of the virtual space is enlarged and displayed, strange feeling can be prevented from being provided to a user, and thus the possibility of VR sickness can be reduced.

The display area with the first size and the display area with the second size may have substantially circular or elliptical shapes and be areas having shapes substantially similar to each other.

According to the above, even if the angle of view of the virtual camera is set to the second angle of view, an image for a left eye and an image for a right eye that have substantially circular or elliptical shapes are displayed, similar to if the angle of view of the virtual camera is set to the first angle of view. Thus, when a part of the virtual space is enlarged and displayed, strange feeling can be prevented from being provided to the user.

The display area with the second size may be an area that is a central portion obtained by removing at least an outer peripheral portion of the display area with the first size.

According to the above, when a part of the virtual space is enlarged and displayed, central portions of the image for a left eye and the image for a right eye excluding outer peripheral portions thereof are displayed. When the image for a left eye and the image for a right eye are seen, the image for a left eye and the image for a right eye look stranger at positions closer to the outer peripheral portions, but the outer peripheral portions are excluded, and thus the possibility of VR sickness can be reduced.

If the angle of view of the virtual camera is set to the second angle of view, the at least one processor may display, at the outer peripheral portion, an image in which the virtual space is invisible or difficult to see.

According to the above, an image, of the virtual space, corresponding to the outer peripheral portion can be invisible or difficult to see. For example, the image of the virtual space may be made difficult to see by displaying a predetermined image different from the image of the virtual space, at the outer peripheral portion to hide the image of the virtual space, or by performing a blurring process on the outer peripheral portion or performing a process of making the outer peripheral portion translucent. Accordingly, the possibility of VR sickness can be reduced.

The at least one processor may be capable of continuously changing the angle of view of the virtual camera from the first angle of view to the second angle of view. The at least one processor may continuously reduce display areas of an image for a left eye and an image for a right eye in each of which a part of the virtual space is enlarged, in accordance with continuous change in the angle of view of the virtual camera from the first angle of view to the second angle of view.

According to the above, by continuously reducing the display areas of the image for a left eye and the image for a right eye in accordance with continuous enlargement of a part of the virtual space, a rapid change in display of the virtual space can be prevented from occurring, and thus the possibility of VR sickness can be reduced.

The at least one processor may be capable of continuously changing the angle of view of the virtual camera from the first angle of view to the second angle of view. In accordance with continuous change in the angle of view of the virtual camera from the first angle of view to the second angle of view, the at least one processor may change display areas of an image for a left eye and an image for a right eye in each of which a part of the virtual space is enlarged, into substantially similar shapes, and continuously reduce the display areas.

According to the above, while the angle of view of the virtual camera continuously changes from the first angle of view to the second angle of view, an image for a left eye and an image for a right eye that have substantially similar shapes are displayed. Thus, when a part of the virtual space is continuously enlarged and displayed, strange feeling can be prevented from being provided to the user, and a rapid change in display of the virtual space can be prevented from occurring. Accordingly, the possibility of VR sickness can be reduced.

The at least one processor may be capable of continuously changing the angle of view of the virtual camera from the first angle of view to the second angle of view. In accordance with continuous change in the angle of view of the virtual camera from the first angle of view to the second angle of view, the at least one processor may continuously reduce display areas of an image for a left eye and an image for a right eye in each of which a part of the virtual space is enlarged, while maintaining each of the display areas in a substantially circular or elliptical shape.

According to the above, when a part of the virtual space is continuously enlarged and displayed, strange feeling can be prevented from being provided to the user, and a rapid change in display of the virtual space can be prevented from occurring. Accordingly, the possibility of VR sickness can be reduced.

The image display system may further include a sensor for detecting an orientation of the goggles apparatus. The at least one processor may control an orientation of the virtual camera on the basis of the orientation of the goggles apparatus, and set a degree of change in the orientation of the virtual camera with respect to a change in the orientation of the goggles apparatus. If the angle of view of the virtual camera is set to the second angle of view, when the orientation of the goggles apparatus changes, the at least one processor may control the orientation of the virtual camera such that the orientation of the virtual camera approaches the orientation of the goggles apparatus by the set degree of change.

According to the above, if a part of the virtual space is enlarged and displayed, when the orientation of the goggles apparatus changes, the orientation of the virtual camera can be changed so as to approach the orientation of the goggles apparatus by the set degree. Accordingly, even if the orientation of the goggles apparatus changes, change in the orientation of the virtual camera VC can be reduced, and, for example, shake of the virtual space due to hand shake can be prevented. Thus, the possibility of VR sickness can be reduced.

If the angle of view of the virtual camera is set to the second angle of view, the at least one processor may set a degree of change in the orientation of the virtual camera with respect to a change in the orientation of the goggles apparatus such that the degree of change is lower than that when the angle of view of the virtual camera is set to the first angle of view.

According to the above, when a part of the virtual space is enlarged, a degree of change in the orientation of the virtual camera is lower than that at normal time. Thus, the possibility of VR sickness when a part of the virtual space is enlarged and displayed can be reduced.

The image display system may further include a sensor for detecting an orientation of the goggles apparatus. The at least one processor may control an orientation of the virtual camera on the basis of the orientation of the goggles apparatus. If the angle of view of the virtual camera is set to the first angle of view, when the orientation of the goggles apparatus changes, the at least one processor may control the orientation of the virtual camera in accordance with the orientation of the goggles apparatus after the change. If the angle of view of the virtual camera is set to the second angle of view, when the orientation of the goggles apparatus changes, the at least one processor may perform a correction process for reducing change in the orientation of the virtual camera and control the orientation of the virtual camera in accordance with the correction process.

According to the above, at normal time, a correction process is not performed, and when the orientation of the goggles apparatus changes, the orientation of the virtual camera is controlled in accordance with the orientation of the goggles apparatus after the change. Meanwhile, at time of enlargement, a correction process for reducing change in the orientation of the virtual camera is performed. Thus, at normal time, the possibility of VR sickness can be reduced by controlling the orientation of the virtual camera such that the orientation of the virtual camera coincides with movement of the user. Meanwhile, at time of enlargement, by reducing change in the orientation of the virtual camera, for example, shake of the virtual space due to hand shake can be prevented, and thus the possibility of VR sickness can be reduced.

The at least one processor may be capable of setting the angle of view of the virtual camera to a third angle of view that is smaller than the first angle of view and larger than the second angle of view, and be capable of continuously changing the angle of view of the virtual camera from the first angle of view to the second angle of view. If the angle of view of the virtual camera is set in a range between the first angle of view and the third angle of view, the at least one processor may display, in the display area with the first size, each of an image for a left eye and an image for a right eye in each of which a part of the virtual space is enlarged. If the angle of view of the virtual camera is set in a range between the third angle of view and the second angle of view, the at least one processor may display, in a display area smaller than the first size and larger than the second size, each of an image for a left eye and an image for a right eye in each of which a part of the virtual space is enlarged.

According to the above, if the angle of view of the virtual camera is set in the range between the first angle of view and the third angle of view, the sizes of the display areas of the image for a left eye and the image for a right eye can be maintained, and, if the angle of view of the virtual camera is set in the range between the third angle of view and the second angle of view, the display areas can be reduced. That is, if an enlargement rate is relatively low, the user is allowed to experience VR with a wide field of view, by displaying an image for a left eye and an image for a right eye with a relatively large size, and, if the enlargement rate is relatively high, the possibility of VR sickness due to enlargement can be reduced by displaying an image for a left eye and an image for a right eye with a relatively small size.

The goggles apparatus may have a tubular portion rotatable in a roll direction. The image display system may further include a sensor for detecting a rotation angle of the tubular portion. The at least one processor may set the angle of view of the virtual camera in accordance with the rotation angle of the tubular portion.

According to the above, the user is allowed to enlarge and display a part of the virtual space, by rotating the tubular portion of the goggles apparatus, that is, by an operation similar to an operation on a real zoom lens, and thus strange feeling can be prevented from being provided to the user. Accordingly, the possibility of VR sickness can be reduced.

If the angle of view of the virtual camera is set to the first angle of view, the at least one processor may set the parallax between the image for a left eye and the image for a right eye to a first parallax. If the angle of view of the virtual camera is set to the second angle of view, the at least one processor may set a parallax between an image for a left eye and an image for a right eye in each of which a part of the virtual space is enlarged, to a second parallax smaller than the first parallax.

According to the above, at time of enlargement of the virtual space, the parallax between the image for a left eye and the image for a right eye can be made smaller than that at normal time. Accordingly, a stereoscopic effect is reduced at time of enlargement, and thus the possibility of VR sickness can be reduced.

The virtual camera may include a left-eye virtual camera for generating the image for a left eye and a right-eye virtual camera for generating the image for a right eye. If the angle of view of the virtual camera is set to the first angle of view, the at least one processor may set a virtual distance between the left-eye virtual camera and the right-eye virtual camera to a first distance. If the angle of view of the virtual camera is set to the second angle of view, the at least one processor may set the virtual distance between the left-eye virtual camera and the right-eye virtual camera to a second distance shorter than the first distance.

According to the above, at time of enlargement of the virtual space, the parallax between the image for a left eye and the image for a right eye can be decreased by narrowing the interval between the left-eye virtual camera and the right-eye virtual camera.

The at least one processor may be capable of continuously changing the angle of view of the virtual camera from the first angle of view to the second angle of view. If the angle of view of the virtual camera continuously changes from the first angle of view to the second angle of view, the at least one processor may continuously shorten the virtual distance between the left-eye virtual camera and the right-eye virtual camera.

According to the above, by continuously shortening the distance between the left-eye virtual camera and the right-eye virtual camera in accordance with continuous enlargement of a part of the virtual space, a rapid change in the stereoscopic effect can be prevented from occurring, and thus the possibility of VR sickness can be reduced.

An angle at which end portions of an image for a left eye and an image for a right eye in each of which a part of the virtual space is enlarged are seen from a viewpoint of a user wearing the goggles apparatus may be larger than an angle at which the virtual space is seen from the virtual camera in a direction along the second angle of view.

According to the above, if the angle of view of the virtual camera is set to the second angle of view, the viewing angle of the user is larger than the angle of view of the virtual camera. For example, an object located in the direction of 15 degrees as seen from the virtual camera is seen in the direction of 45 degrees when being seen from the user. Therefore, the user sees a narrow range of the virtual space at a wide viewing angle, and thus can see an enlarged part of the virtual space with a wide field of view. In this case, the display areas of the image for a left eye and the image for a right eye are reduced, and thus the possibility of VR sickness can be reduced.

An image display system according to another exemplary embodiment includes a goggles apparatus and at least one processor, and the at least one processor is configured to: dispose a virtual camera in a virtual space; generate an image for a left eye and an image for a right eye that are images representing a part of the virtual space and that have a parallax therebetween, on the basis of the virtual camera; display the image for a left eye and the image for a right eye on a display section of the goggles apparatus; and make setting of enlarging and displaying a part of the virtual space as compared to that at normal time. The at least one processor is configured to, if the setting of enlarging and displaying is made, display, in a left display area, the image for a left eye in which a part of the virtual space is enlarged and an outer peripheral image for a left eye surrounding an outer periphery of the image for a left eye, and display, in a right display area, the image for a right eye in which a part of the virtual space is enlarged and an outer peripheral image for a right eye surrounding an outer periphery of the image for a right eye. In addition, the at least one processor is configured to, if the setting of enlarging and displaying is made, display each of the enlarged image for a left eye and the enlarged image for a right eye in a display area smaller than that when the setting of enlarging and displaying is not made.

According to the above, if the setting of enlarging and displaying is made, an image for a left eye and an image for a right eye in each of which a part of the virtual space is enlarged are displayed so as to be smaller than those at normal time, and an outer peripheral image is displayed at each of the outer peripheries of the image for a left eye and the image for a right eye. Accordingly, even when a part of the virtual space is enlarged, the possibility of VR sickness can be reduced.

If the setting of enlarging and displaying is made, the at least one processor may display each of the outer peripheral image for a left eye and the outer peripheral image for a right eye in a display area larger than that when the setting of enlarging and displaying is not made.

According to the above, if the setting of enlarging and displaying is made, the outer peripheral image for a left eye and the outer peripheral image for a right eye can be displayed so as to be larger than those when the setting of enlarging and displaying is not made.

Another exemplary embodiment may provide a non-transitory storage medium having stored therein an image display program causing a processor of an apparatus, configured to display an image on a display section of a goggles apparatus, to perform the above processes. In addition, still another exemplary embodiment may provide an image display apparatus configured to display an image on a display section of a goggles apparatus, the image display apparatus being configured to perform the above processes. Moreover, still another exemplary embodiment may provide an image display method executed in the above image display system including the goggles apparatus.

According to the exemplary embodiments, a part of the virtual space can be enlarged and displayed, and the possibility of VR sickness can be reduced.

These and other objects, features, aspects and advantages of the exemplary embodiment will become more apparent from the following detailed description when taken in conjunction with the accompanying drawings.

BRIEF DESCRIPTION OF THE DRAWINGS

FIG. 28 is an example non-limiting flowchart showing an example of an enlarged image display process in step S107.

DETAILED DESCRIPTION OF NON-LIMITING EXAMPLE EMBODIMENTS

Figure 1:
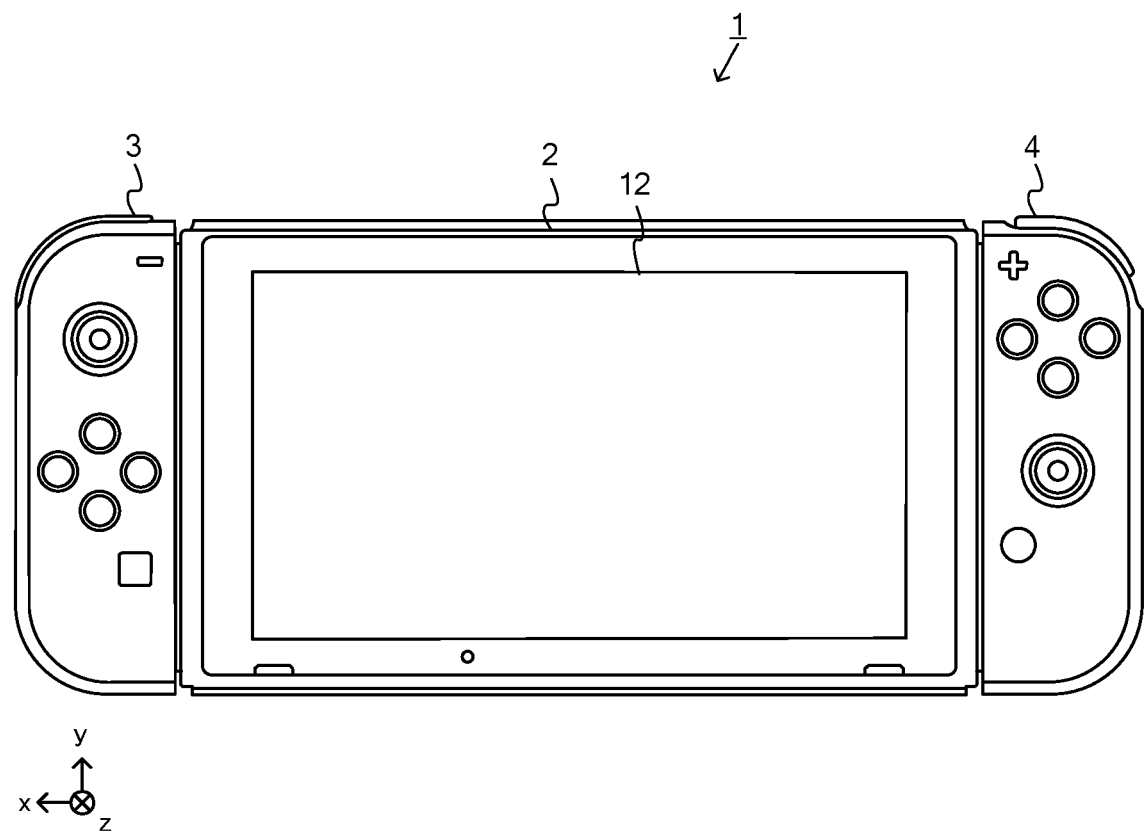
FIG. 1 is an example non-limiting diagram showing an example of the state where the left controller 3 and the right controller 4 are attached to the main body apparatus 2.

Hereinafter, an image display system 100 according to an exemplary embodiment (see FIG. 11) is described with reference to the drawings. The image display system 100 according to the exemplary embodiment is a system that allows a user to experience virtual reality (VR). For example, a predetermined game may be performed in a VR space using the image display system 100. First, a game system 1 (an example of an information processing system) included in the image display system 100 is described.

(Description of Game System 1)

An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the image display system 100 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
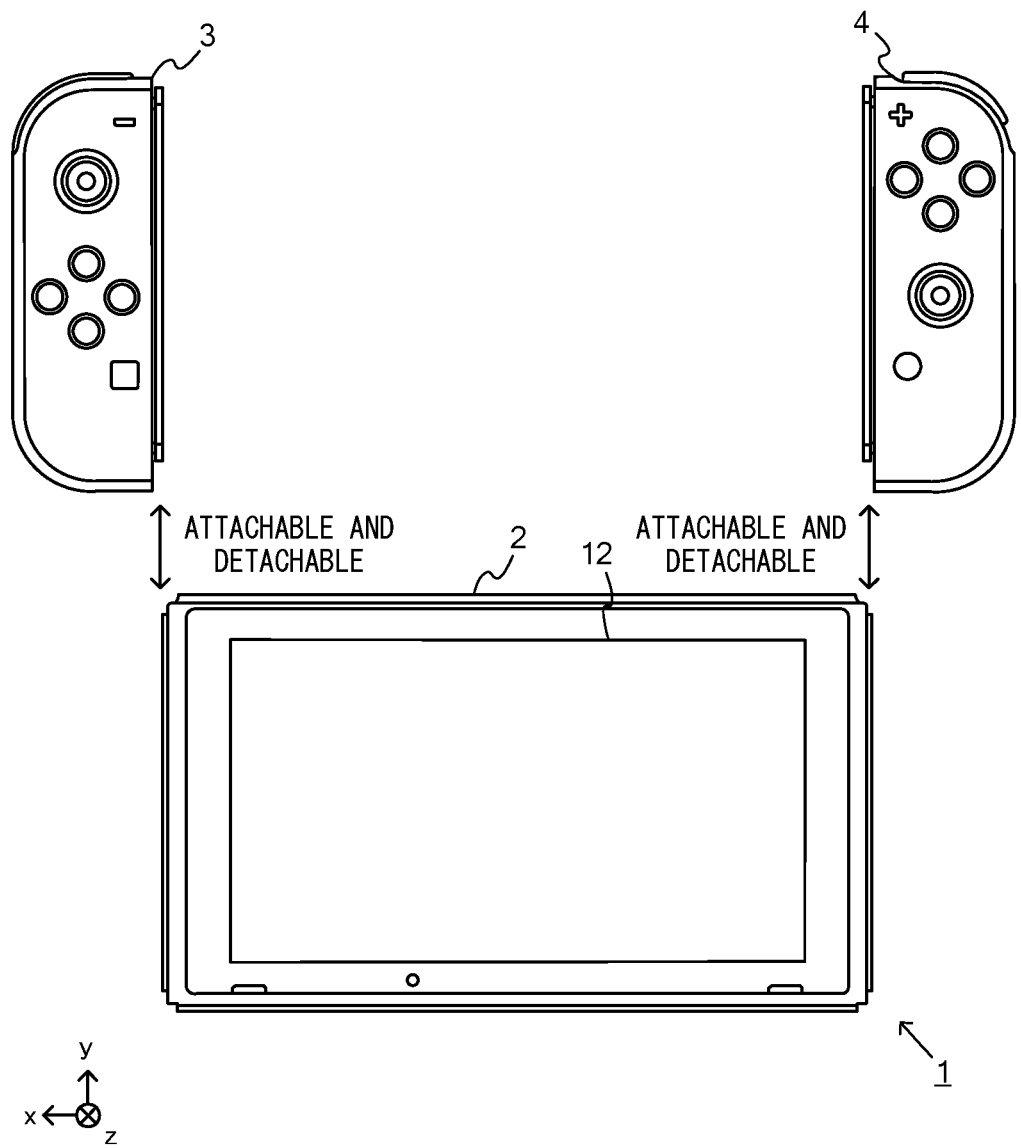
FIG. 2 is an example non-limiting diagram showing an example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
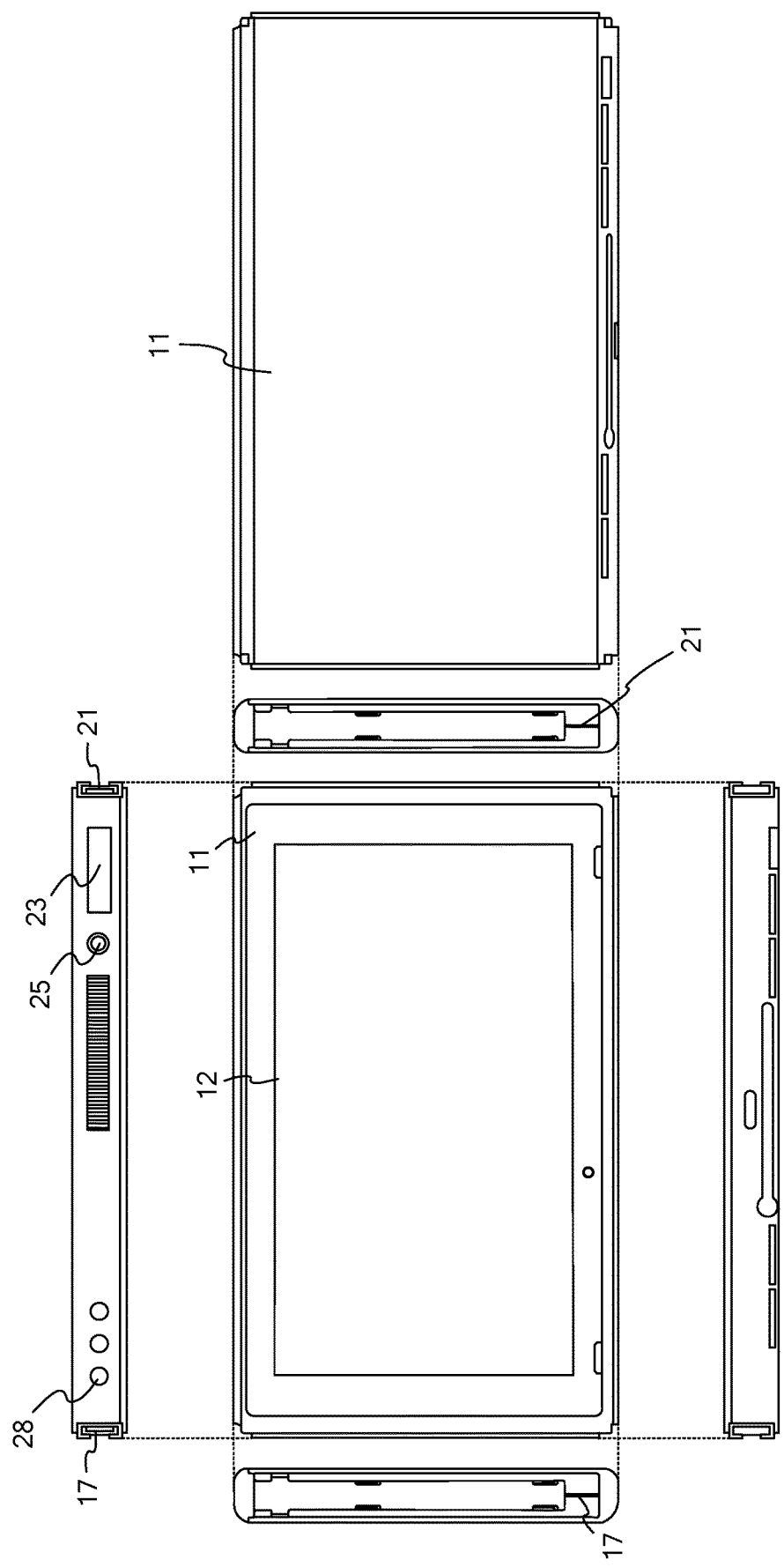
FIG. 3 is an example non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
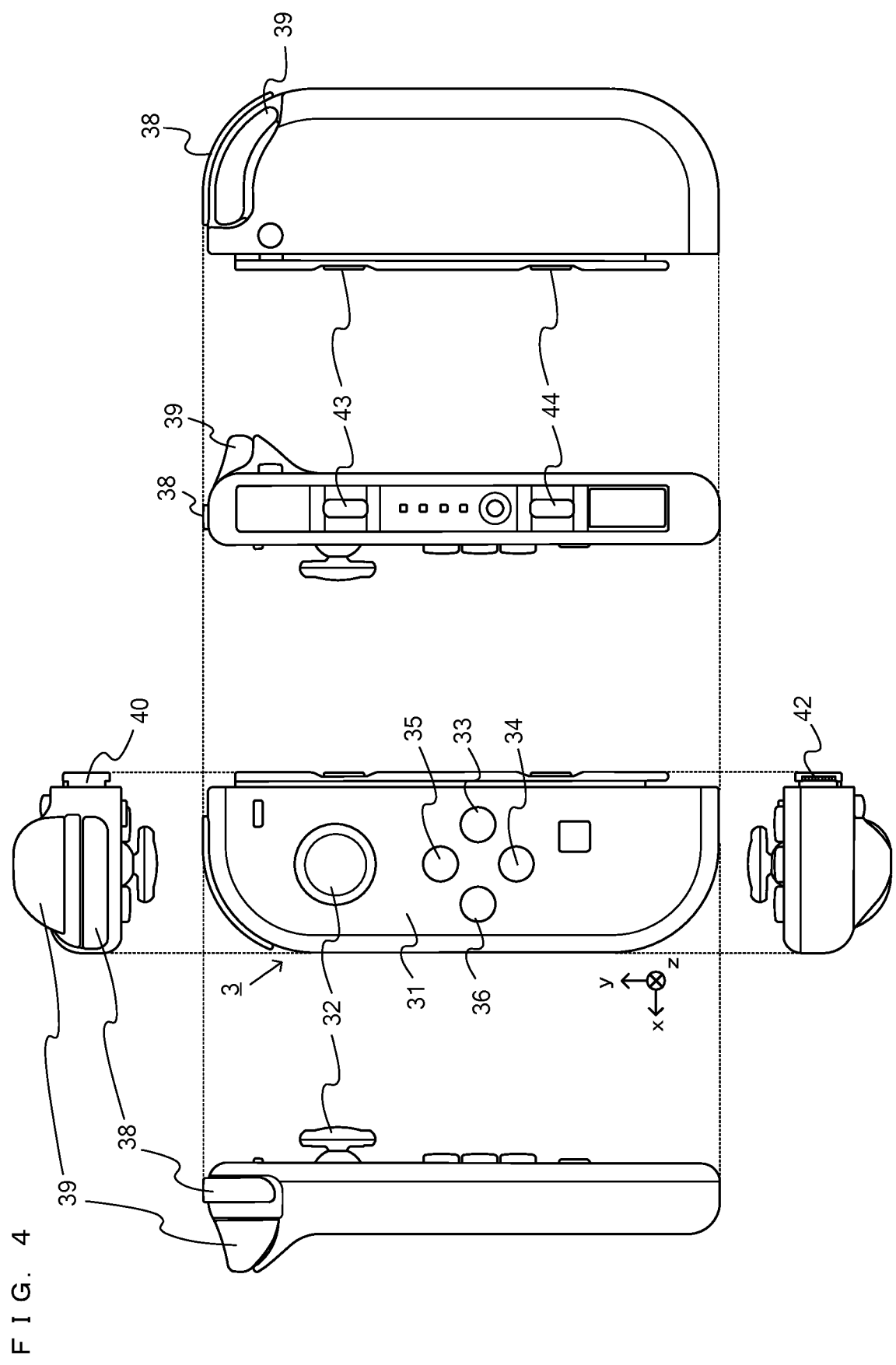
FIG. 4 is an example non-limiting six orthogonal views showing an example of the left controller 3.

FIG. 4 is six orthogonal views showing an example of the left controller 3.

The left controller 3 includes an analog stick 32. As shown in FIG. 4, the analog stick 32 is provided on a main surface of the housing 31. The analog stick 32 can be used as a direction input section with which a direction can be input.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Similar to the left controller 3, the right controller 4 also includes an analog stick and a plurality of buttons. The description of the right controller 4 is omitted.

Figure 5:
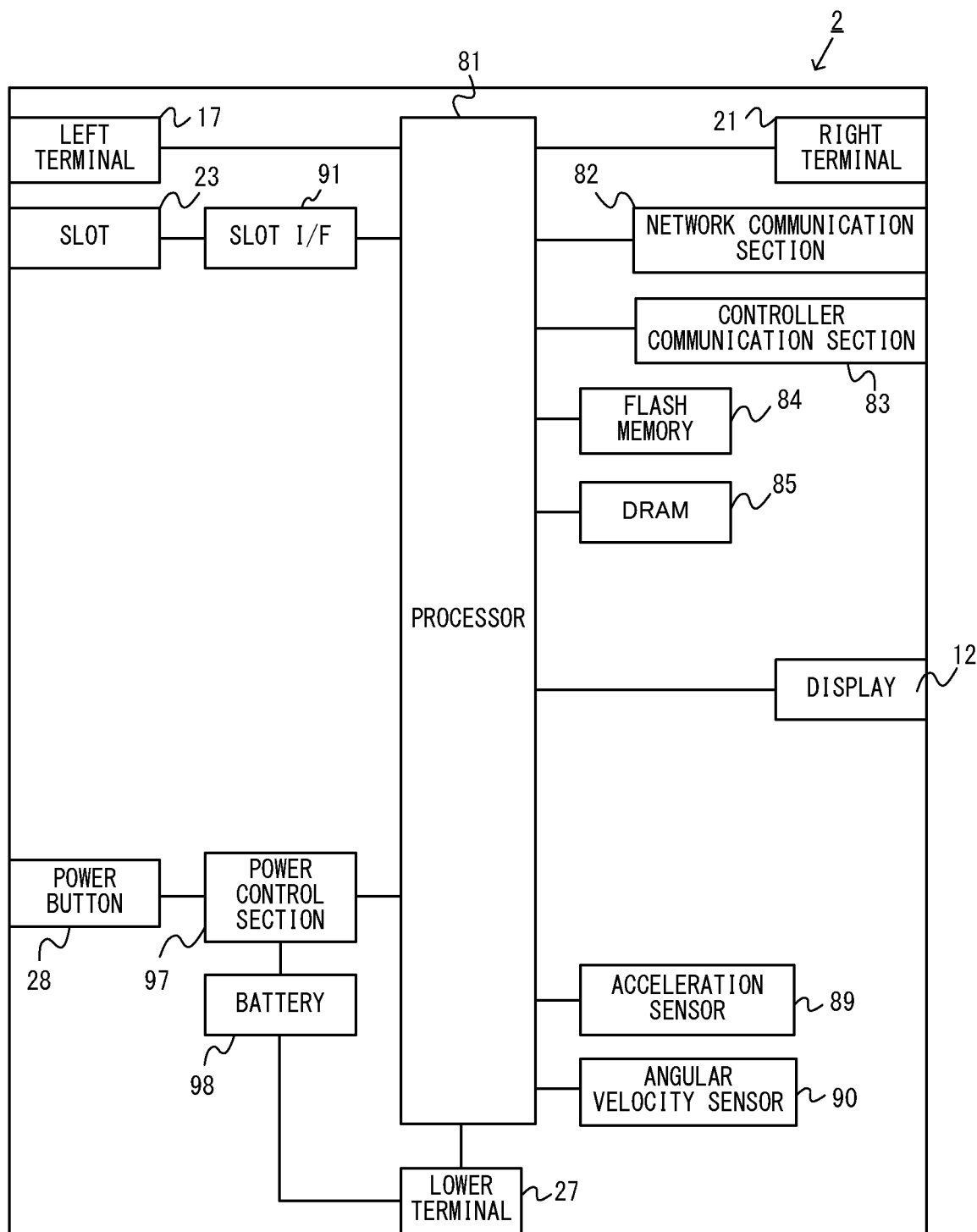
FIG. 5 is an example non-limiting block diagram showing an example of the internal configuration of the main body apparatus 2.

FIG. 5 is a block diagram showing an example of the internal configuration of the main body apparatus 2.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21.

Further, the display 12 is connected to the processor 81. The processor 81 displays a generated image (e.g., an image generated by executing the above information processing) and/or an externally acquired image on the display 12.

Further, the main body apparatus 2 includes an acceleration sensor 89 as an inertial sensor. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90 as an inertial sensor. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 6:
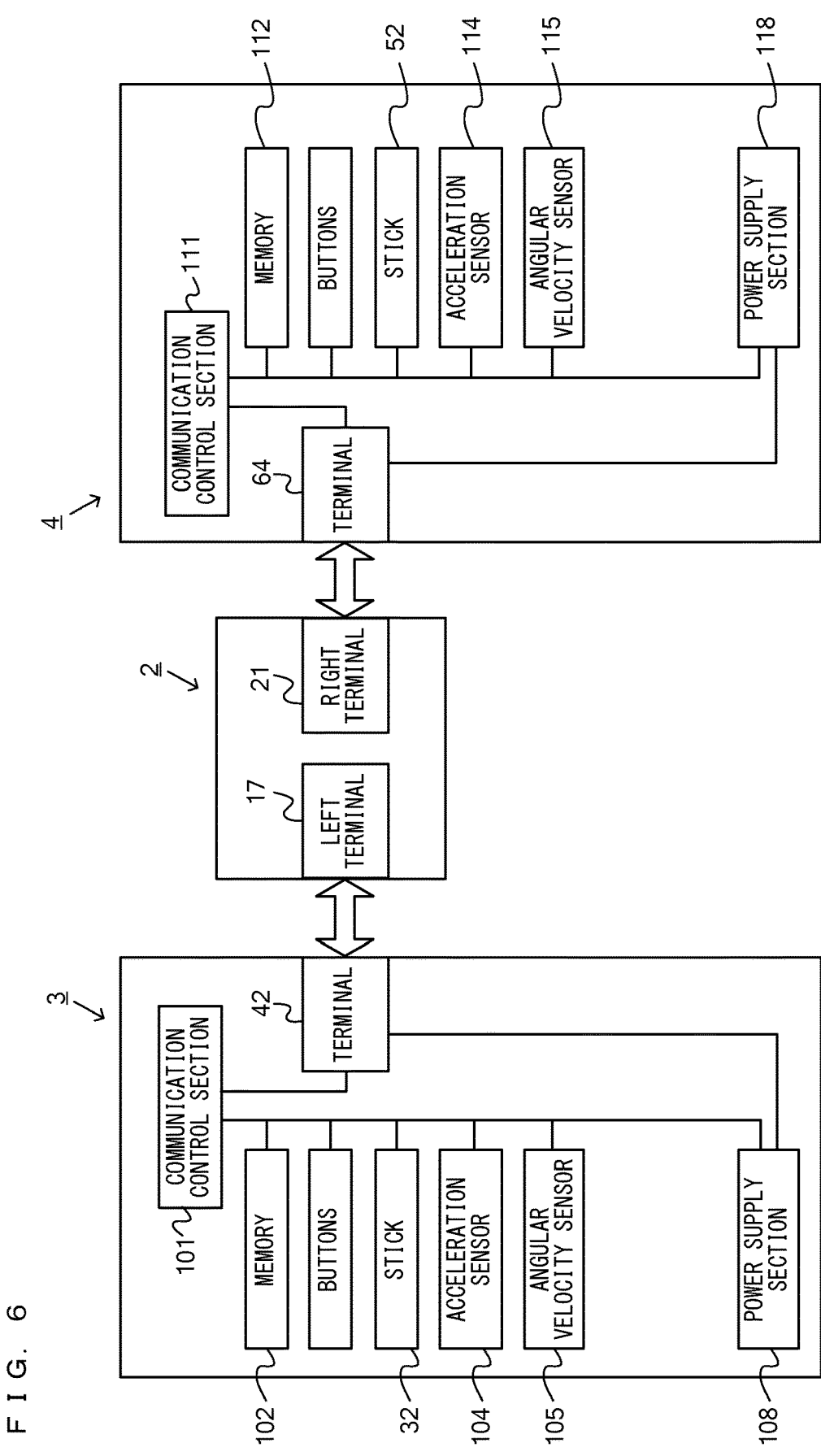
FIG. 6 is an example non-limiting block diagram showing examples of the internal configurations of the main body apparatus 2, the left controller 3, and the right controller 4.

FIG. 6 is a block diagram showing examples of the internal configurations of the main body apparatus 2, the left controller 3, and the right controller 4. It should be noted that the details of the internal configuration of the main body apparatus 2 are shown in FIG. 5 and therefore are omitted in FIG. 6.

The left controller 3 includes a communication control section 101, which communicates with the main body apparatus 2, in addition to the above-described respective buttons and the analog stick 32. As shown in FIG. 6, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

Similar to the left controller 3, the right controller 4 also includes a communication control section 111, a memory 112, an acceleration sensor 114, an angular velocity sensor 115, and a power supply section 118. The description of the right controller 4 is omitted.

(Description of Image Display System 100)

Figure 8:
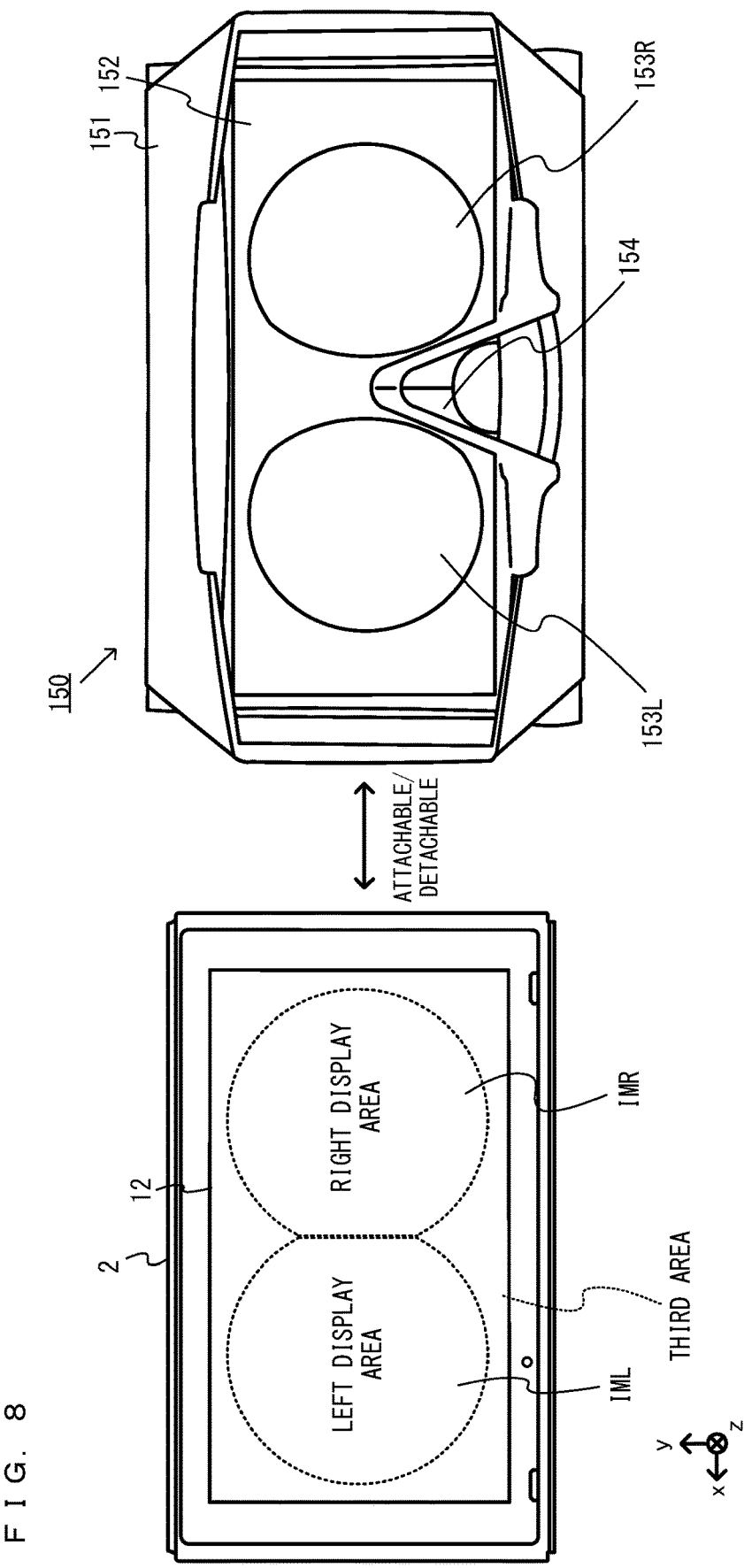
FIG. 8 is an example non-limiting front view showing an example of the state where the main body apparatus 2 is attached to the goggles apparatus 150.
Figure 9:
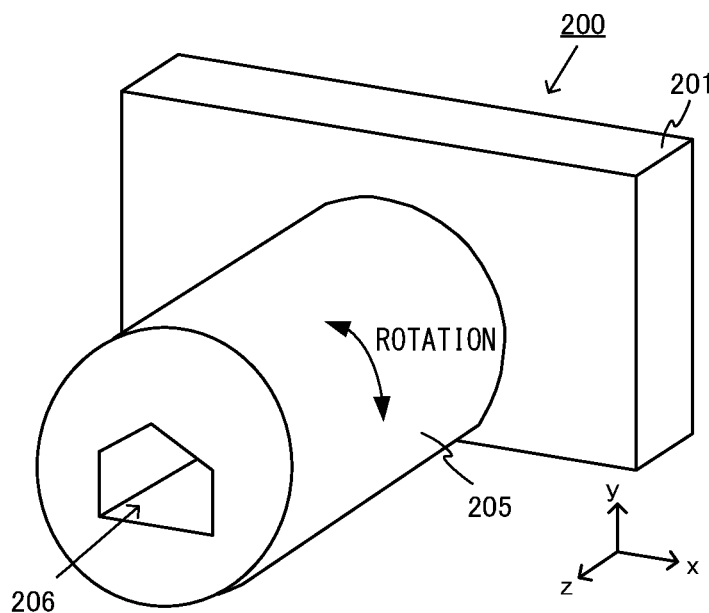
FIG. 9 is an example non-limiting perspective view showing an example of the appearance of a camera apparatus 200.

Next, an example of the image display system 100 is described with reference to FIGS. 7 to 11. The image display system 100 according to the exemplary embodiment includes a goggles apparatus 150 (FIG. 7) to which the main body apparatus 2 is attached, and a camera apparatus 200 (FIG. 9). Hereinafter, each of the goggles apparatus 150 and the camera apparatus 200 is described, and then, the image display system 100 including the goggles apparatus 150 and the camera apparatus 200 is described.

Figure 7:
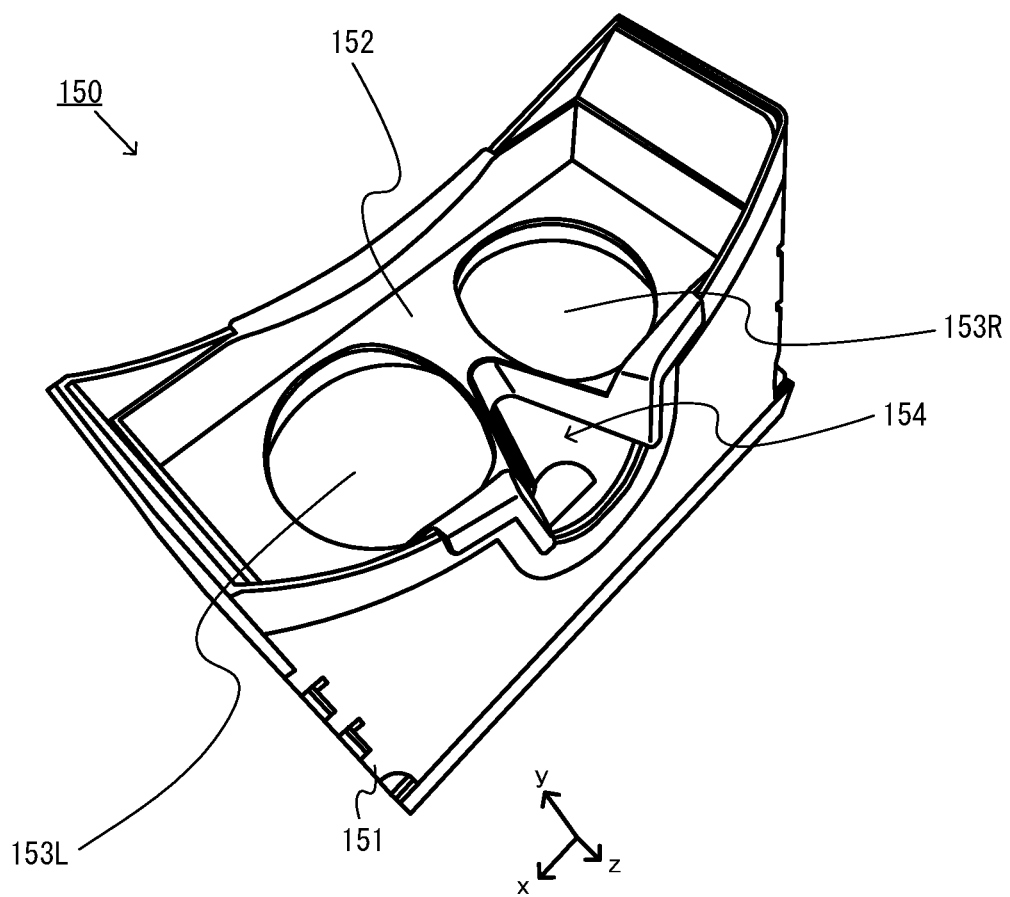
FIG. 7 is an example non-limiting perspective view showing an example of the appearance of a goggles apparatus 150.
Figure 10:
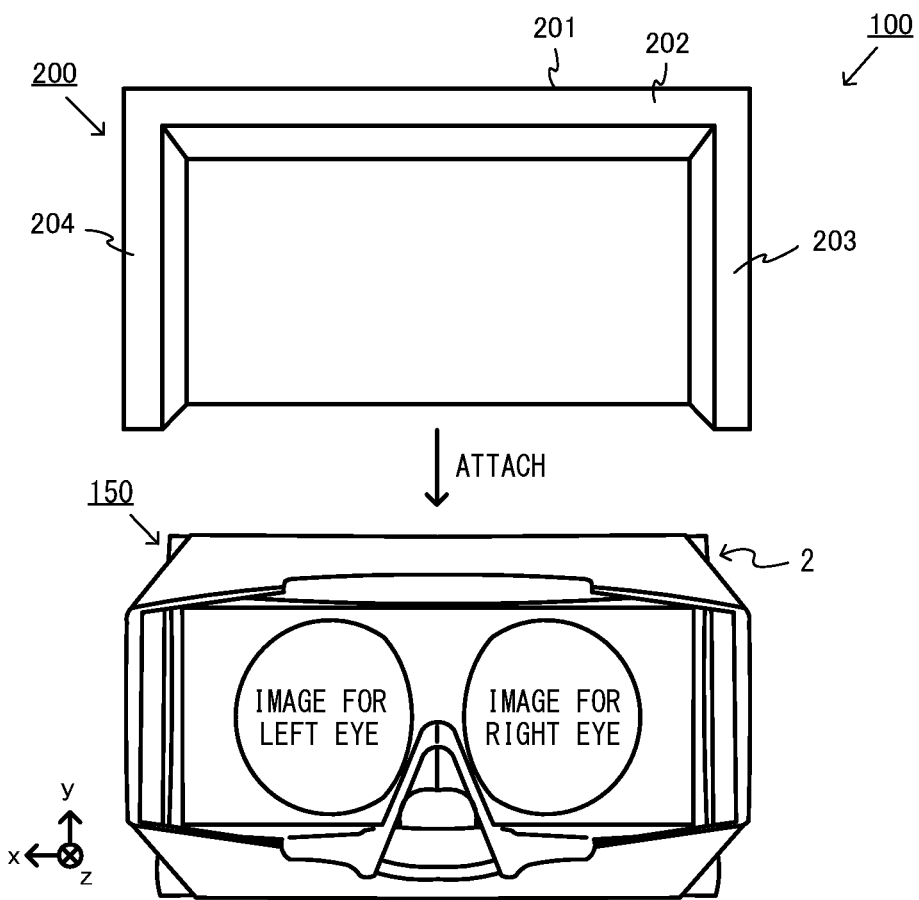
FIG. 10 is an example non-limiting diagram showing an example of how the camera apparatus 200 is attached to the goggles apparatus 150 including the main body apparatus 2.
Figure 11:
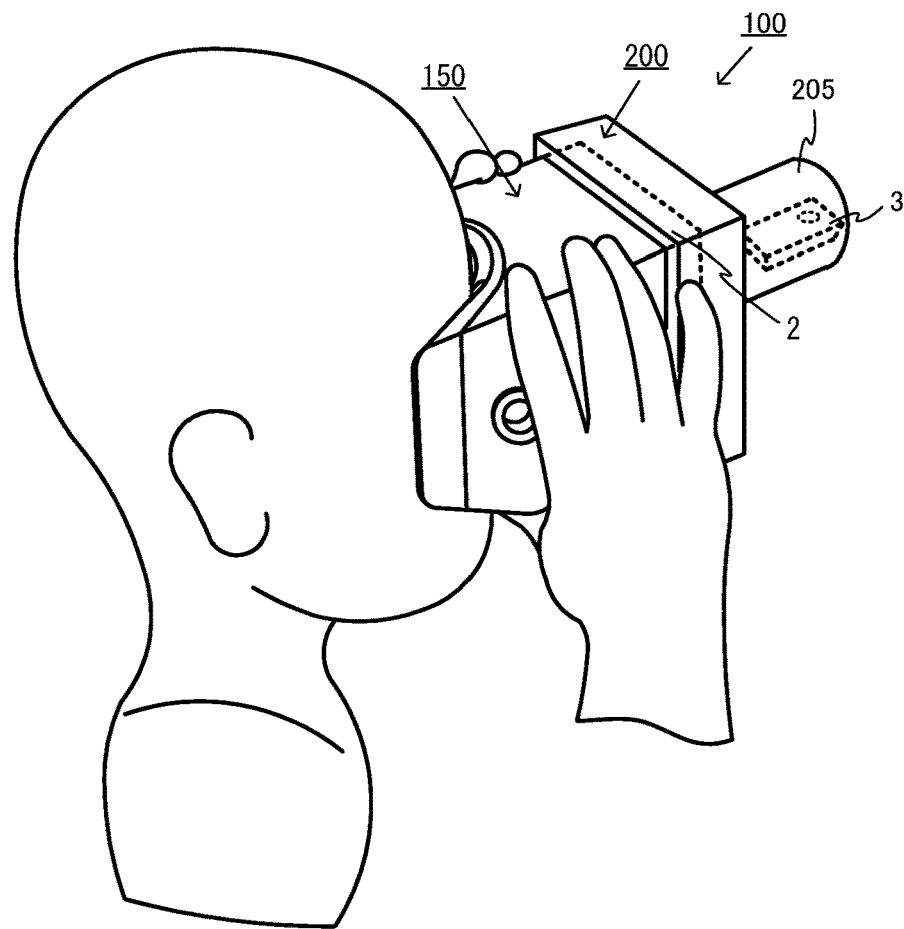
FIG. 11 is an example non-limiting diagram showing an example of how a user views an image displayed on an image display system 100.

FIG. 7 is a perspective view showing an example of the appearance of the goggles apparatus 150. FIG. 8 is a front view showing an example of the state where the main body apparatus 2 is attached to the goggles apparatus 150. FIG. 9 is a perspective view showing an example of the appearance of the camera apparatus 200. FIG. 10 is a diagram showing an example of how the camera apparatus 200 is attached to the goggles apparatus 150 including the main body apparatus 2. FIG. 11 is a diagram showing an example of how the user views an image displayed on the image display system 100.

As shown in FIG. 7, the goggles apparatus 150 includes a goggles main body 151, a lens frame member 152, and a lens 153 (a left eye lens 153L and a right eye lens 153R). Here, the goggles apparatus 150 that is an example of an apparatus forming the image display system is fitted and worn on the face of the user so as to cover the left and right eyes of the user, and has a function of blocking at least part of external light and a function of supporting a stereoscopic view of the user by a pair of lenses.

The goggles main body 151 has an attachment portion that detachably fixes the main body apparatus 2 by coming into contact with the front surface, the back surface, the upper surface, and the lower surface of the main body apparatus 2. The goggles main body 151 has a front surface contact portion that is brought into contact with a part of the front surface of the main body apparatus 2 (the surface in which the display 12 is provided), a back surface contact portion that is brought into contact with the back surface of the main body apparatus 2, an upper surface contact portion that is brought into contact with the upper surface of the main body apparatus 2, and a lower surface contact portion that is brought into contact with the lower surface of the main body apparatus 2. The attachment portion is formed by a space formed so as to be surrounded by the front surface contact portion, the back surface contact portion, the upper surface contact portion, and the lower surface contact portion. The attachment portion is open at the left side surface and/or the right side surface thereof in order to allow the main body apparatus 2 to be attached from the left side or the right side of the main body apparatus 2. As shown in FIG. 8, for example, the goggles apparatus 150 including the main body apparatus 2 is configured by attaching the main body apparatus 2 through the opening at the left side surface. In addition, left and right openings for allowing the user to view displayed images (an image for a left eye and an image for a right eye) on the display 12 when the main body apparatus 2 is attached are formed in the front surface contact portion of the goggles main body 151.

The lens frame member 152 is fixed to the near side of the front surface contact portion of the goggles main body 151 (the near side in the sheet of FIG. 7). The lens frame member 152 is a member for fixing a pair of the left eye lens 153L and the right eye lens 153R. The lens frame member 152 has left and right openings. The positions and the sizes of the left and right openings of the lens frame member 152 substantially coincide with the positions and the sizes of the left and right openings provided in the front surface contact portion of the goggles main body 151. The left eye lens 153L and the right eye lens 153R are fitted and fixed in the left and right openings of the lens frame member 152, respectively. The distance between the centers of the left eye lens 153L and the right eye lens 153R is set to the distance between the left and right eyes of an average user.

The goggles apparatus 150A is provided with a recess 154 for receiving the nose of the user. When the user wears the goggles apparatus 150 such that the nose of the user is received in the recess 154, the left eye lens 153L is located in front of the left eye of the user, and the right eye lens 153R is located in front of the right eye of the user.

As shown in FIG. 8, when the main body apparatus 2 is attached to the goggles main body 151, an image IML for a left eye displayed in a left display area (area surrounded by a broken line) of the display 12 is viewed by the left eye of the user through the left eye lens 153L. The image IML for a left eye is an image with a substantially circular shape having a portion (portion close to an image for a right eye) that is straight. The left eye lens 153L has a circular shape and allows the user to view the image IML for a left eye with their left eye. The left eye of the user is surrounded by the left side surface, the upper surface, the lower surface, and a partition surface (not shown) of the goggles main body 151, and the partition surface separates left and right. Thus, an image for a left eye is viewed by the left eye of the user, but the surrounding environment and an image for a right eye are unlikely to be viewed by the left eye of the user.

Moreover, an image IMR for a right eye displayed in a right display area (area surrounded by a broken line) of the display 12 is viewed by the right eye of the user through the right eye lens 153R. The image IMR for a right eye is an image with a substantially circular shape having a portion (portion close to an image for a left eye) that is straight. The right eye lens 153R has a circular shape and allows the user to view the image IMR for a right eye with their right eye. The right eye of the user is surrounded by the right side surface, the upper surface, the lower surface, and the partition surface of the goggles main body 151. Thus, an image for a right eye is viewed by the right eye of the user, but the surrounding environment and an image for a left eye are unlikely to be viewed by the right eye of the user.

Each of the shapes of the image for a left eye and the image for a right eye may be a circle, may be an ellipse, may be a substantially circular or elliptical shape obtained by deforming a part of a circle or an ellipse, or may be a polygonal shape, a star shape, or the like.

Moreover, as shown in FIG. 9, the image display system 100 includes the camera apparatus 200. The camera apparatus 200 includes a camera main body portion 201 and a tubular portion 205. The camera apparatus 200 has a shape like a real camera as a whole. The camera apparatus 200 is a fake camera that does not have an actual image pickup element and an actual lens. The tubular portion 205 is provided at the front surface side (at the z-axis positive direction side in FIG. 9) of the camera apparatus 200. The tubular portion 205 is a substantially cylindrical member. The direction of the central axis of the tubular portion 205 substantially coincides with the line-of-sight direction of the user when the user uses the image display system 100. That is, the tubular portion 205 is formed such that the tubular portion 205 extends from the front surface of the image display system 100 in the line-of-sight direction of the user when the user uses the image display system 100. In addition, the tubular portion 205 is configured to be rotatable in a roll direction (about the central axis of the tubular portion 205). For example, the tubular portion 205 is configured to be rotatable by 90 degrees in the roll direction from a normal state shown in FIG. 9. The tubular portion 205 imitates, for example, a telephoto zoom lens for a real camera.

The tubular portion 205 has an opening 206 in a distal end portion. The left controller 3 (or the right controller 4) is inserted into the opening 206. For example, the left controller 3 is inserted into the opening 206 and detects a rotation angle of the tubular portion 205 in the roll direction. The opening 206 has a mountain-like shape having a central portion higher in the upper direction (a y-axis direction in FIG. 9) than left and right portions when the tubular portion 205 is not rotated. When the tubular portion 205 is not rotated, the left controller 3 is inserted into the opening 206 in the longitudinal direction (in a y-axis direction in FIG. 4) such that the main surface of the housing 31 of the left controller 3 faces upward. Since the opening 206 has a mountain-like shape, the left controller 3 having the analog stick 32 projecting in a direction perpendicular to the main surface thereof can be inserted into the opening 206. In addition, when the tubular portion 205 is rotated in the roll direction, the left controller 3 inserted into the opening 206 also rotates about the y-axis, but the inserted left controller 3 can be fixed by the analog stick 32 and the mountain-like portion coming into contact with each other, whereby the left controller 3 can be prevented from moving within the opening 206.

The upper diagram in FIG. 10 shows the camera apparatus 200 at the side opposite to the tubular portion 205. As shown in FIG. 10, the camera main body portion 201 includes an upper surface portion 202, a right side surface portion 203, and a left side surface portion 204. The goggles apparatus 150 to which the main body apparatus 2 is attached is (partially) fitted into a recess formed by the upper surface portion 202, the right side surface portion 203, and the left side surface portion 204. For example, at least a portion, of the goggles apparatus 150, corresponding to the main body apparatus 2 is fitted into the recess formed by the upper surface portion 202, the right side surface portion 203, and the left side surface portion 204. Accordingly, the image display system 100 is configured.

As shown in FIG. 11, the user holds the image display system 100 including the goggles apparatus 150 and the camera apparatus 200, and views an image for a left eye and an image for a right eye displayed on the display 12 of the main body apparatus 2. Specifically, the main body apparatus 2 defines a virtual space, and generates an image for a left eye and an image for a right eye that have a parallax therebetween, on the basis of a left virtual camera and the right virtual camera. The main body apparatus 2 displays the generated image for a left eye and the generated image for a right eye in the left display area and the right display area of the display 12, respectively. Accordingly, the user can view a stereoscopic image and experience virtual reality (VR) as if the user existed in the virtual space.

(Display of Virtual Space)

Next, images displayed on the image display system 100 according to the exemplary embodiment are described. The image display system 100 according to the exemplary embodiment allows the user to experience VR and also provides a zoom-in (close-up) function of enlarging a part of a VR space. In the following, the virtual space defined by the main body apparatus 2 is described, and then, the zoom-in function in the VR space is described.

Figure 12:
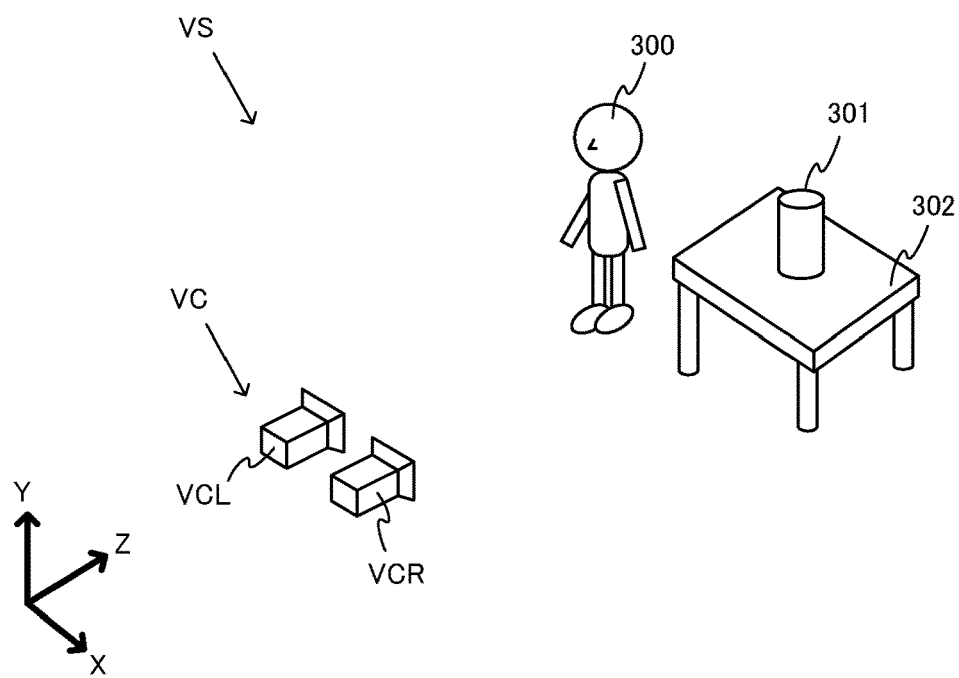
FIG. 12 is an example non-limiting diagram showing an example of a virtual space constructed in the main body apparatus 2.

FIG. 12 is a diagram showing an example of a virtual space constructed in the main body apparatus 2. An XYZ orthogonal coordinate system is set in the virtual space VS. The X-axis is an axis extending in the horizontal direction of the virtual space VS. The Y-axis is an axis extending in the height direction of the virtual space VS. The Z-axis is an axis perpendicular to the X-axis and the Y-axis and is an axis extending in the depth direction of the virtual space.

The left virtual camera VCL and the right virtual camera VCR are disposed in the virtual space VS. The heights of the left virtual camera VCL and the right virtual camera VCR may be set to a height that is equal to the eye height of an average person. In addition, the line-of-sight directions of the left virtual camera VCL and the right virtual camera VCR are set to be same. In the following, when the left virtual camera VCL and the right virtual camera VCR are not distinguished from each other, the left virtual camera VCL and the right virtual camera VCR are sometimes collectively referred to as "virtual camera VC".

The orientation of the virtual camera VC is controlled such that the orientation of the virtual camera VC coincides with the orientation of the image display system 100 (goggles apparatus 150) in the real space. For example, the main body apparatus 2 calculates the orientation of the main body apparatus 2 on the basis of an angular velocity value and/or an acceleration value detected by the angular velocity sensor 90 and/or the acceleration sensor 89. Specifically, the main body apparatus 2 calculates a change in the orientation of the main body apparatus 2 from the time of initialization by integrating the angular velocity value from the angular velocity sensor 90. The main body apparatus 2 controls the orientations of the left virtual camera VCL and the right virtual camera VCR in the virtual space in accordance with the calculated orientation. For example, when the main body apparatus 2 is oriented such that a straight line perpendicular to the display 12 is parallel to the ground, the virtual camera VC is directed in a direction parallel to the XZ plane of the virtual space. When the user rotates the goggles apparatus 150 (main body apparatus 2) in a yaw direction (right-left direction) by 90 degrees from this orientation, the virtual camera VC also rotates in the yaw direction (right-left direction) within the virtual space by 90 degrees.

Moreover, various virtual objects are disposed in the virtual space VS. The types of virtual objects to be disposed are different, for example, depending on a scene of a game. For example, in the example shown in FIG. 12, a character object 300, a table object 302, and a columnar object 301 on the table object 302 are disposed in the virtual space VS. The user views a stereoscopic image of the virtual space VS by viewing an image for a left eye and an image for a right eye obtained when the virtual space VS is seen from the left virtual camera VCL and the right virtual camera VCR, with their left eye and right eye, respectively. In the present specification, the term "for" does not means that it is used exclusively for it, and, for example, an image for a left eye or an image for a right eye may be viewed by both eyes.

Figure 13:
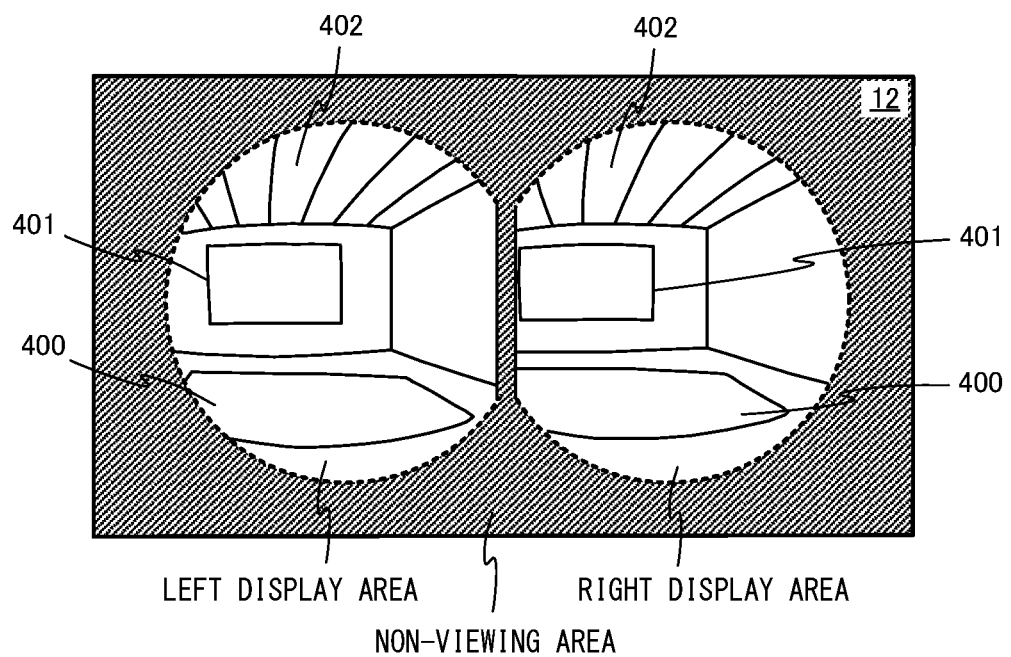
FIG. 13 is an example non-limiting diagram showing an example of images displayed on a display 12 of the main body apparatus 2 in another scene.

Here, an image for a left eye and an image for a right eye displayed on the display 12 at normal time (that is, when zoom-in is not performed) are described. FIG. 13 is a diagram showing an example of images displayed on the display 12 of the main body apparatus 2 in another scene. In FIG. 13, for example, a scene in a virtual room is displayed.

As shown in FIG. 13, an image for a left eye obtained when the virtual space is seen from the left virtual camera VCL is displayed in a substantially circular left display area surrounded by a broken line. In addition, an image for a right eye obtained when the virtual space is seen from the right virtual camera VCR is displayed in a substantially circular right display area surrounded by a broken line. The left display area and the right display area have the same size and have shapes that are axisymmetric to each other about the center in the right-left direction of the display 12 as an axis. The area (the hatched area in FIG. 13) other than the left display area and the right display area is an area that is not visible or is difficult to see when being viewed by the user through the lens 153. The area that is not visible or is difficult to see is sometimes referred to as a "non-viewing area". For example, a black image is displayed in the non-viewing area. In addition, the contours of the left display area and the right display area (the boundaries thereof with the non-viewing area) are unclearly displayed by a blurring process.

As images of virtual objects, images of a carpet 400, a window 401, and a ceiling 402 are included in the image for a left eye and the image for a right eye. The image for a left eye to be displayed in the left display area of the display 12 is corrected in consideration of being viewed by the left eye of the user through the left eye lens 153L. Specifically, when the image for a left eye is displayed on the display 12, the image for a left eye is distorted as a whole in consideration of the optical characteristics (lens distortion (distortion aberration)) of the left eye lens 153L.

For example, the carpet 400 is disposed as a rectangular object in the virtual space. In addition, the window 401 is a rectangular object having long sides parallel to the X-axis in the virtual space and short sides parallel to the Y-axis. Moreover, the ceiling 402 is an object with a linear pattern drawn in the virtual space. For example, the pattern of the ceiling 402 includes straight lines parallel to the Z-axis in the virtual space. In an image generated on the basis of the virtual camera VC, straight portions of the respective objects become straight when distortion corresponding to the characteristics of the left eye lens 153L is not added.

When an image for a left eye is generated, the main body apparatus 2 does not render the virtual space seen from the left virtual camera VCL as it is, but generates the image for a left eye with addition of distortion corresponding to the characteristics of the left eye lens 153L. Thus, the image for a left eye displayed on the display 12 has a distorted shape as a whole, and each object has a distorted shape. For example, the image of the carpet 400 in the image for a left eye has a shape that is more distorted at a position closer to the outer peripheral portion of the image for a left eye. In addition, the window 401 also has a shape that is more distorted at a position closer to the outer peripheral portion of the image for a left eye. Moreover, the pattern of the ceiling 402 is curved rather than straight, in the image for a left eye, and is more distorted at a position closer to the outer peripheral portion of the image for a left eye.

As described above, the degree of distortion is higher in the outer peripheral portion of the image for a left eye than in a central portion of the image for a left eye. This is because, when the image for a left eye is viewed through the left eye lens 153L, the outer peripheral portion of the image becomes more distorted than the central portion of the image. The main body apparatus 2 distorts the entire image in consideration of such characteristics of the left eye lens 153L such that the image is more distorted at a position closer to the outer peripheral portion of the image.

Similar to the image for a left eye, the image for a right eye is an image to which distortion corresponding to the characteristics of the right eye lens 153R is added. The image for a left eye and the image for a right eye have a parallax therebetween. For example, when the image for a left eye and the image for a right eye are compared to each other, the window 401 is closer to the left side in the image for a right eye than in the image for a left eye.

In the following, a process of adding distortion to an image in consideration of such characteristics of the lens 153 is sometimes referred to as "distortion correction".

The user views the image for a left eye and the image for a right eye shown in FIG. 13, through the left eye lens 153L and the right eye lens 153R, respectively. When the user views these images, the distortion added to each image is cancelled by the lens 153, and the images become natural for the user.

Figure 14:
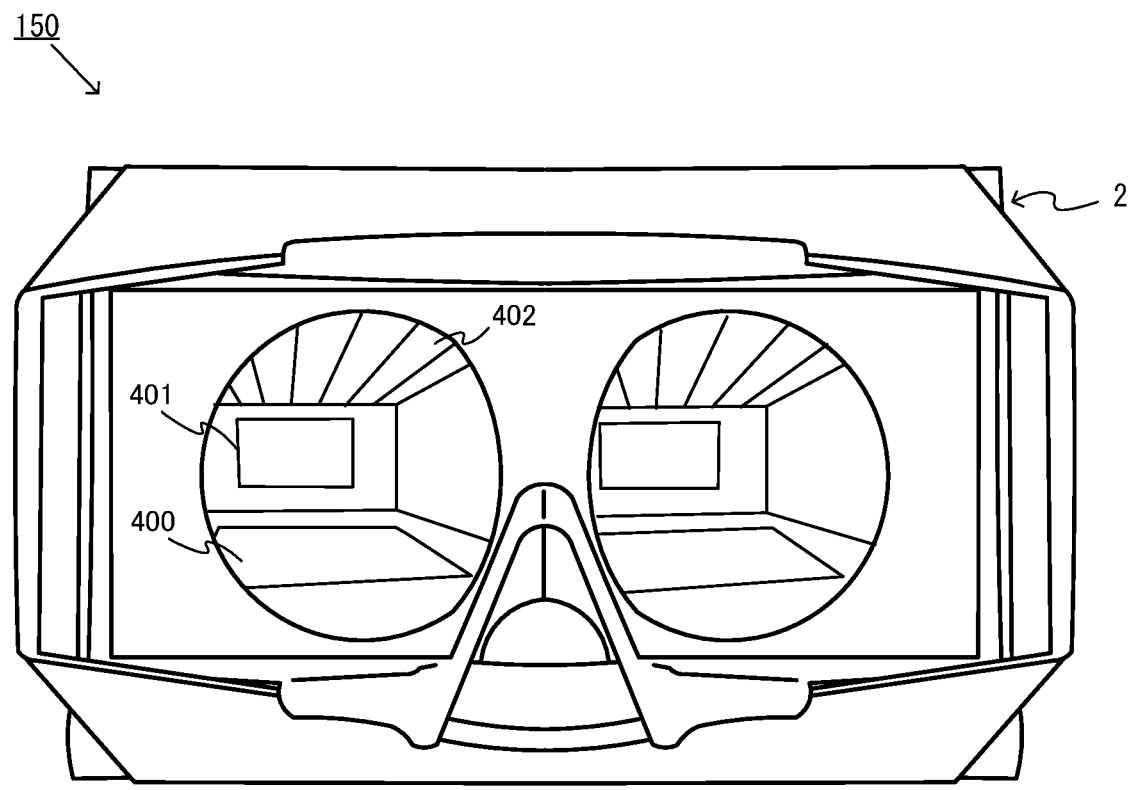
FIG. 14 is an example non-limiting diagram showing an example of the state where an image for a left eye and an image for a right eye shown in FIG. 13 are viewed through a left eye lens 153L and a right eye lens 153R.

FIG. 14 is a diagram showing an example of the state where the image for a left eye and the image for a right eye shown in FIG. 13 are viewed through the left eye lens 153L and the right eye lens 153R, respectively.

As shown in FIG. 14, the image for a left eye and the image for a right eye viewed through the lens 153 are not images distorted as a whole as shown in FIG. 13 but natural images. For example, the straight portions of the respective objects are displayed as curved portions in FIG. 13, but are viewed as being straight when viewed through the lens 153.

As described above, an image obtained when the virtual space is seen from the virtual camera VC is not displayed as it is, and an image on which distortion correction corresponding to the characteristics of the lens 153 has been performed is displayed in the display area of the display 12. Then, when the user views the image for a left eye and the image for a right eye displayed on the display 12 through the lens 153, the distortion of each image is cancelled by the lens 153. Thus, when the user views the image for a left eye and the image for a right eye through the lens 153, the user recognizes these images as a natural stereoscopic image of the virtual space and feels as if the virtual objects that exist in the virtual space were present in the real space. For example, when a virtual object is displayed 5 m away from the virtual camera VC in the virtual space, the user feels as if the virtual object actually existed 5 m away from the user. In addition, the user is allowed to change the orientations of the left virtual camera VCL and the right virtual camera VCR and see the virtual space in various directions by changing the orientation of the goggles apparatus 150.

(Enlargement Display of Virtual Space)

With the image display system 100 according to the exemplary embodiment, the user is allowed to enlarge a part of the virtual space by rotating the tubular portion 205. Specifically, when the tubular portion 205 is rotated, the left controller 3 (or the right controller 4) provided within the tubular portion 205 rotates. The main body apparatus 2 acquires the orientation of the left controller 3 on the basis of operation data from the left controller 3, and narrows the angles of view of the left virtual camera VCL and the right virtual camera VCR in accordance with the acquired orientation of the left controller 3. Accordingly, a part of the virtual space is enlarged (zoomed in).

Figure 15:
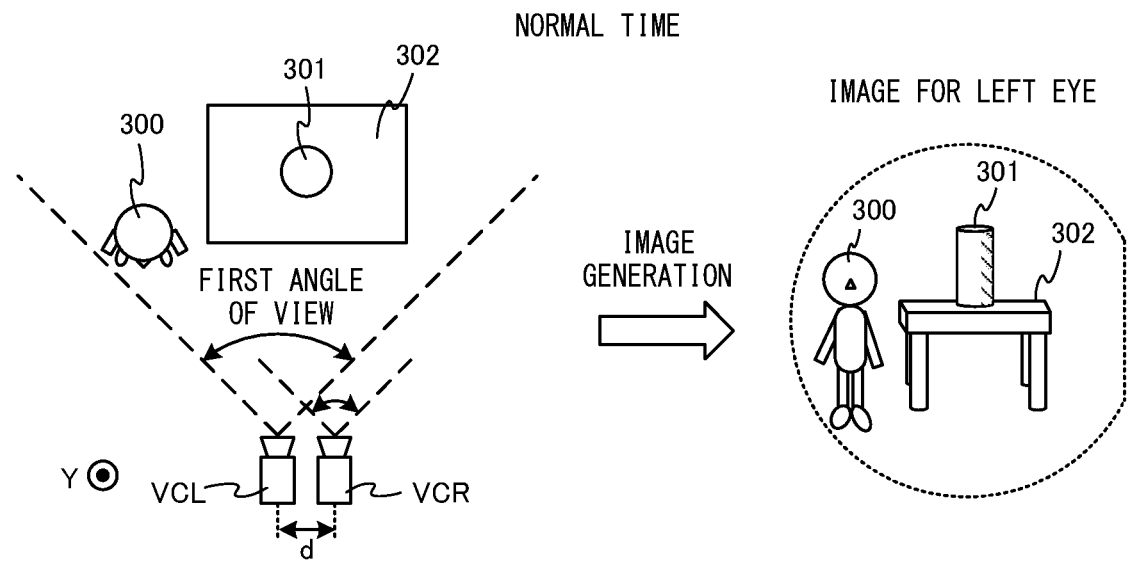
FIG. 15 is an example non-limiting diagram showing an example of an angle of view of a left virtual camera VCL at normal time and an image for a left eye generated at the angle of view.
Figure 16:
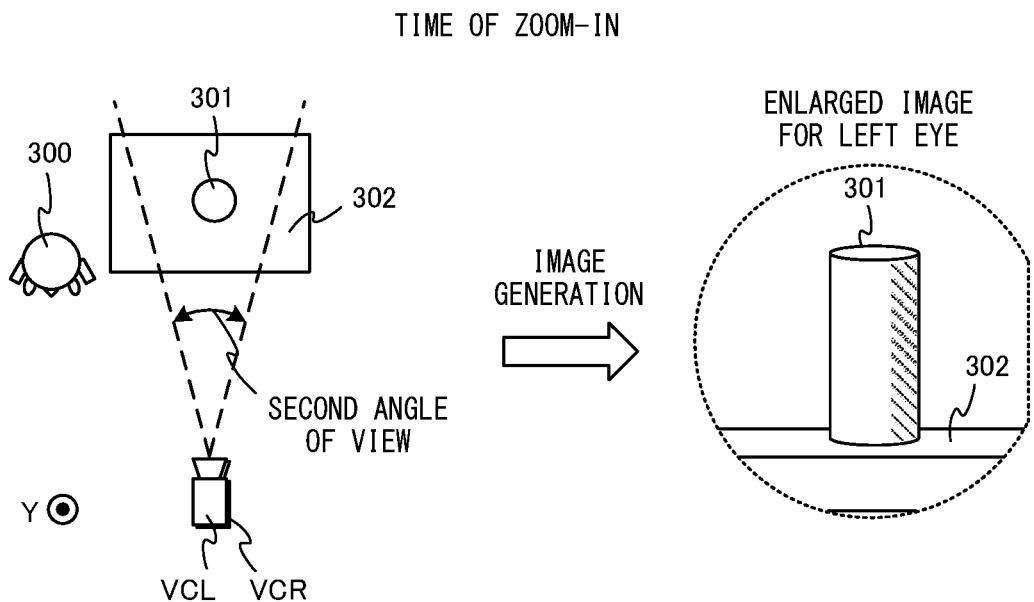
FIG. 16 is an example non-limiting diagram showing an example of an angle of view of the left virtual camera VCL at time of zoom-in and an image for a left eye generated at the angle of view.

FIG. 15 is a diagram showing an example of an angle of view of the left virtual camera VCL at normal time and an image for a left eye generated at the angle of view. FIG. 16 is a diagram showing an example of an angle of view of the left virtual camera VCL at time of zooming-in and an image for a left eye generated at the angle of view.

In FIGS. 15 and 16, views of the virtual space as seen from above are shown. In images for a left eye at the right side in FIGS. 15 and 16, the above-described distortion is omitted for the sake of description.

As shown in FIG. 15, the angles of view of the left virtual camera VCL and the right virtual camera VCR are normally set to a first angle of view (for example, 90 degrees). In addition, the distance (inter-camera distance) d between the left virtual camera VCL and the right virtual camera VCR is normally set to a distance equal to the interval between the left and right eyes of an average user.

If the angle of view of the left virtual camera VCL is set to the first angle of view, the character object 300, the columnar object 301, the table object 302 are included within the angle of view of the left virtual camera VCL. An image of the virtual space included within the first angle of view is generated as an image for a left eye. In this case, for example, the image for a left eye shown in the drawing at the right side in FIG. 15 is generated. Specifically, the main body apparatus 2 performs projective transformation (perspective projection) of the virtual space included within the first angle of view from the position of the left virtual camera VCL, and generates an image for a left eye with a predetermined size. When the image for a left eye is generated, the above-described distortion correction is performed. In addition, the same applies to an image for a right eye.

If the user rotates the tubular portion 205, the angles of view of the left virtual camera VCL and the right virtual camera VCR are narrowed. For example, if the user maximally rotates the tubular portion 205, the angles of view of the left virtual camera VCL and the right virtual camera VCR are set to a second angle of view (for example, 30 degrees). If the angle of view of the virtual camera VC is set to the second angle of view, the entirety of the columnar object 301 and a part of the table object 302 are included within the angle of view of the virtual camera VC. An image that is an image of the virtual space included within the angle of view of the virtual camera VC and that has a predetermined size is generated. That is, if the angle of view of the virtual camera VC is set to the second angle of view, an enlarged image for a left eye in which a part of the virtual space included when the angle of view of the virtual camera VC is set to the first angle of view is enlarged, is generated. For example, an image for a left eye that includes an enlarged image of the entirety of the columnar object 301 as compared to that in FIG. 15 and an enlarged image of a part of the table object 302 as shown in FIG. 16, is generated.

Moreover, if the angle of view of the virtual camera VC is set to the second angle of view, the inter-camera distance d is smaller than that when the angle of view of the virtual camera VC is set to the first angle of view. That is, if the angle of view of the virtual camera VC is set to the second angle of view, the parallax between the image for a left eye and the image for a right eye is smaller than that when the angle of view of the virtual camera VC is set to the first angle of view. In the exemplary embodiment, if the angle of view of the virtual camera VC is set to the second angle of view, the inter-camera distance d is set to "0", and the parallax between the image for a left eye and the image for a right eye becomes zero.

In the exemplary embodiment, the angle of view of the virtual camera VC continuously changes from the first angle of view (for example, 90 degrees) to the second angle of view (for example, 30 degrees) in accordance with a rotation angle of the tubular portion 205 (left controller 3). In addition, the inter-camera distance d continuously changes from the first angle of view to the second angle of view in accordance with a rotation angle of the tubular portion 205 (left controller 3).

Moreover, in the exemplary embodiment, while the angle of view of the virtual camera VC continuously changes from the first angle of view to the second angle of view, a part of the virtual space is continuously enlarged, and the display areas of the image for a left eye and the image for a right eye continuously reduce. In the following, an image for a left eye and an image for a right eye displayed on the display 12 when the angle of view of the virtual camera VC changes from the first angle of view to the second angle of view, are described with reference to FIGS. 17 to 20.

Figure 17:
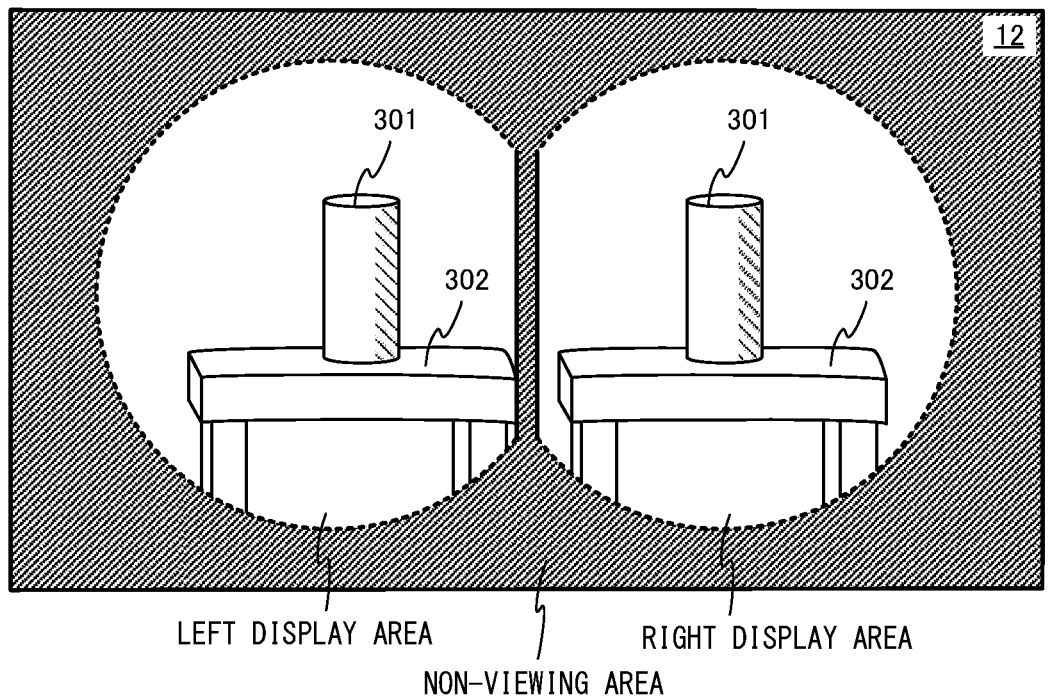
FIG. 17 is an example non-limiting diagram showing an example of an image for a left eye and an image for a right eye displayed on the display 12 when the angle of view of a virtual camera VC is set to a third angle of view A that is smaller than a first angle of view and larger than a second angle of view.
Figure 18:
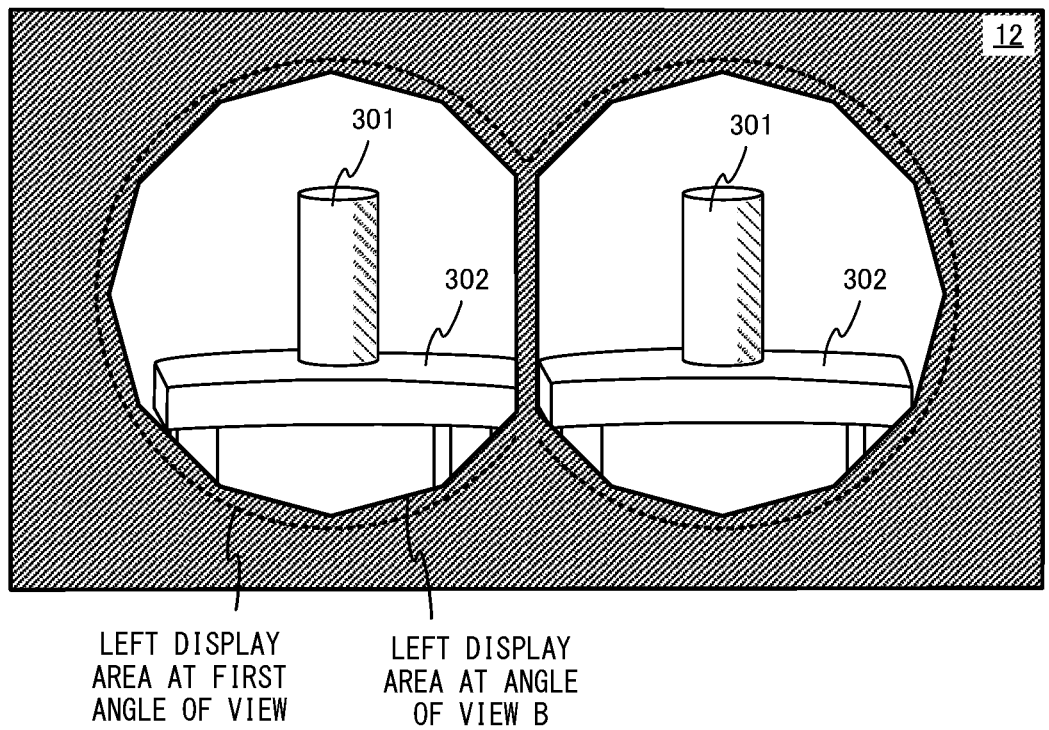
FIG. 18 is an example non-limiting diagram showing an example of an image for a left eye and an image for a right eye displayed on the display 12 when the angle of view of the virtual camera VC is set to a third angle of view B that is smaller than the third angle of view A and larger than the second angle of view.
Figure 19:
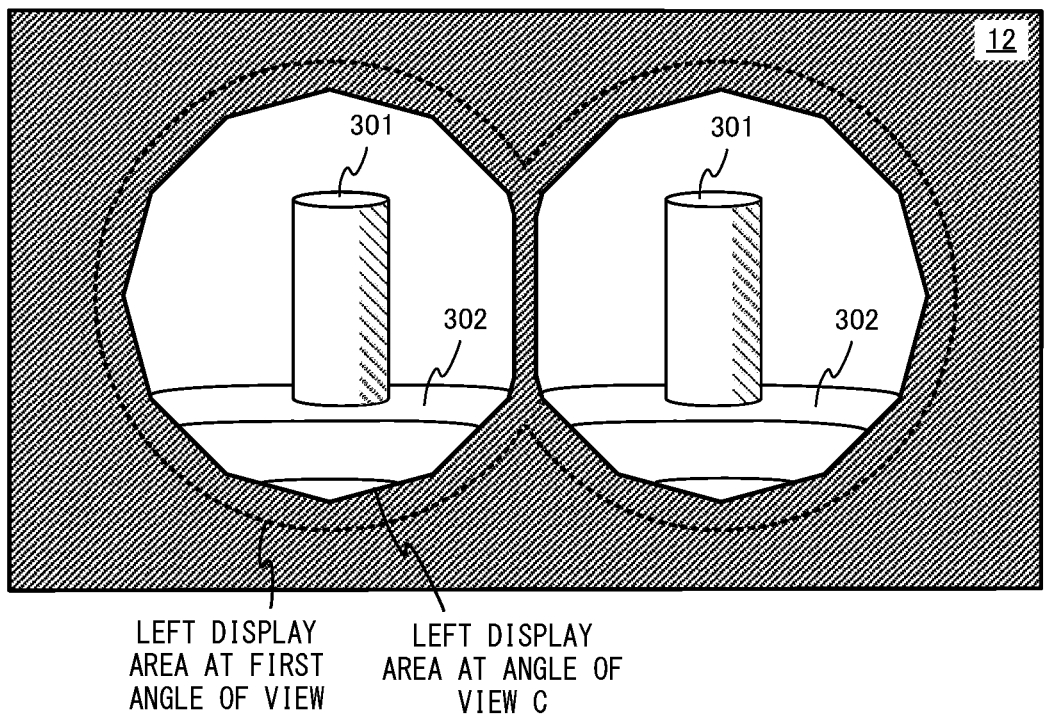
FIG. 19 is an example non-limiting diagram showing an example of an image for a left eye and an image for a right eye displayed on the display 12 when the angle of view of the virtual camera VC is set to a third angle of view C that is smaller than the third angle of view B and larger than the second angle of view.
Figure 20:
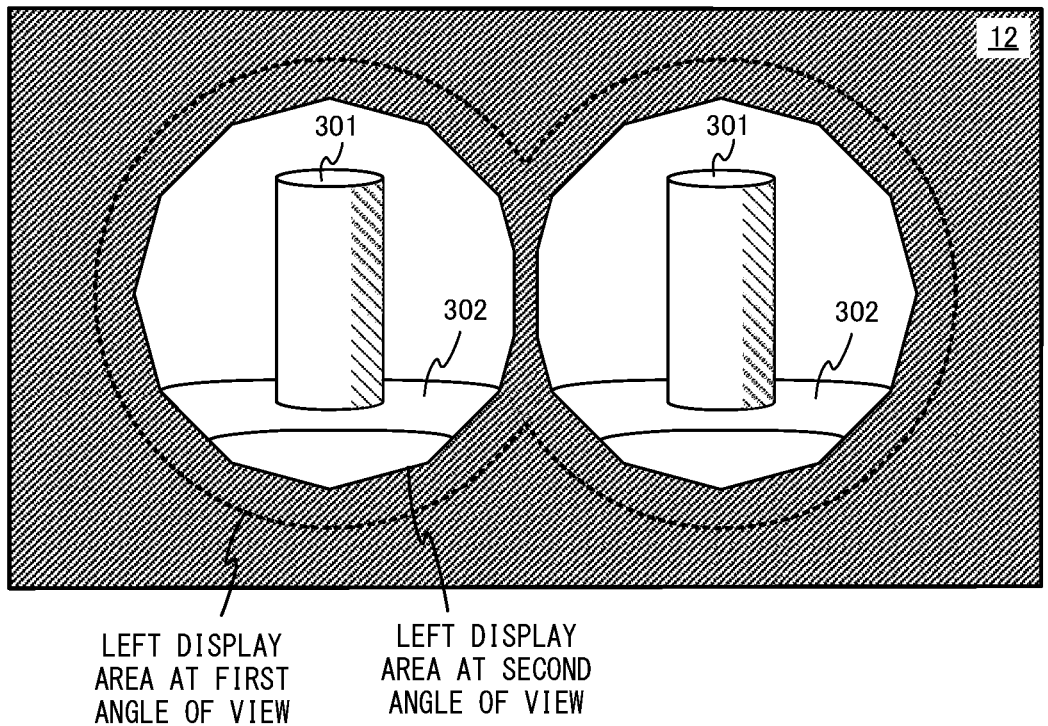
FIG. 20 is an example non-limiting diagram showing an example of an image for a left eye and an image for a right eye displayed on the display 12 when the angle of view of the virtual camera VC is set to the second angle of view.

FIG. 17 is a diagram showing an example of an image for a left eye and an image for a right eye displayed on the display 12 when the angle of view of the virtual camera VC is set to a third angle of view A that is smaller than the first angle of view and larger than the second angle of view. FIG. 18 is a diagram showing an example of an image for a left eye and an image for a right eye displayed on the display 12 when the angle of view of the virtual camera VC is set to a third angle of view B that is smaller than the third angle of view A and larger than the second angle of view. FIG. 19 is a diagram showing an example of an image for a left eye and an image for a right eye displayed on the display 12 when the angle of view of the virtual camera VC is set to a third angle of view C that is smaller than the third angle of view B and larger than the second angle of view. FIG. 20 is a diagram showing an example of an image for a left eye and an image for a right eye displayed on the display 12 when the angle of view of the virtual camera VC is set to the second angle of view.

As shown in FIG. 17, if the angle of view of the virtual camera VC is set to the third angle of view A (for example, 50 degrees), an image in which a part of the virtual space is enlarged is displayed. For example, whereas the character object 300, the columnar object 301, and the table object 302 are displayed and the columnar object 301 is displayed to be relatively small in FIG. 15, the entirety of the enlarged columnar object 301 and a part of the enlarged table object 302 are displayed in FIG. 17. That is, if the angle of view of the virtual camera VC is set to the third angle of view A, the display sizes of the columnar object 301 and the table object 302 are larger than those when the angle of view of the virtual camera VC is set to the first angle of view. If the angle of view of the virtual camera VC is set to the third angle of view A (for example, 50 degrees), the display areas of the enlarged image for a left eye and the enlarged image for a right eye have the same size as the display areas when the angle of view is set to the first angle of view. In addition, the non-viewing area other than the left display area and the right display area is filled with black. The contours of the left display area and the right display area (the boundaries thereof with the non-viewing area) are unclearly displayed by a blurring process.

As shown in FIG. 18, if the angle of view of the virtual camera VC is set to the third angle of view B (for example, 45 degrees), a part of the virtual space is further enlarged. For example, in FIG. 18, the columnar object 301 and the table object 302 are further enlarged and displayed as compared to those in FIG. 17. In this case, the display areas of the enlarged image for a left eye and the enlarged image for a right eye are smaller than those in FIG. 17. In FIG. 18, the left display area and the right display area when the angle of view of the virtual camera VC is set to the first angle of view are shown by a broken line, and the left display area and the right display area when the angle of view of the virtual camera VC is set to the third angle of view B are displayed by solid lines. By filling the area, surrounded by the broken line and the solid lines, with black similar to the non-viewing area, the display areas of an image for a left eye and an image for a right eye in each of which a part of the virtual space is enlarged are made smaller. In other words, by cutting off outer peripheral portions of the image for a left eye and the image for a right eye, the display areas of these images are reduced. The image for a left eye and the image for a right eye in each of which a part of the virtual space is enlarged have the same size and are axisymmetric to each other.

When the angle of view of the virtual camera VC is the first angle of view (90 degrees), the left display area and the right display area are substantially circular, and, when the angle of view of the virtual camera VC is the third angle of view B (45 degrees), the shapes of the left display area and the right display area are also nearly circular and are, for example, substantially regular dodecagons. When the angle of view of the virtual camera VC is the third angle of view B, the left display area and the right display area are areas obtained by removing outer peripheral portions of the left display area and the right display area when the angle of view of the virtual camera VC is the first angle of view. In addition, if the left display area and the right display area are reduced, the above-described blurring process is not performed, and the contours of the left display area and the right display area are clear. Even if the angle of view of the virtual camera VC is decreased, the contours of the left display area and the right display area may be made unclear.

Moreover, as shown in FIG. 19, if the angle of view of the virtual camera VC is set to the third angle of view C (for example, 35 degrees), a part of the virtual space is further enlarged. The objects 301 and 302 in the image for a left eye and the image for a right eye in FIG. 19 are displayed so as to be larger than the objects 301 and 302 in the image for a left eye and the image for a right eye in FIG. 18. In addition, the display areas of the image for a left eye and the image for a right eye in each of which a part of the virtual space is enlarged are reduced further from those in FIG. 18. That is, when the angle of view of the virtual camera VC is set to the third angle of view C (35 degrees), the left display area and the right display area are smaller than the left display area and the right display area when the angle of view of the virtual camera VC is set to the third angle of view B (45 degrees). In other words, if the angle of view of the virtual camera VC is set to the third angle of view C, the outer peripheral portions of the image for a left eye and the image for a right eye are more greatly cut than when the angle of view of the virtual camera VC is set to the third angle of view B. When the angle of view of the virtual camera VC is the third angle of view C, the shapes of the left display area and the right display area are substantially regular dodecagons, similar to when the angle of view of the virtual camera VC is the third angle of view B. Also, if the angle of view of the virtual camera VC is set to the third angle of view C, the image for a left eye and the image for a right eye in each of which a part of the virtual space is enlarged have the same size and are axisymmetric to each other.

Moreover, as shown in FIG. 20, if the angle of view of the virtual camera VC is set to the second angle of view (for example, 30 degrees), a part of the virtual space is further enlarged. The objects 301 and 302 in the image for a left eye and the image for a right eye in FIG. 20 are larger than the objects 301 and 302 in the image for a left eye and the image for a right eye in FIG. 19. In addition, the display areas of the image for a left eye and the image for a right eye in each of which a part of the virtual space is enlarged are reduced further from those in FIG. 19. That is, when the angle of view is set to the second angle of view (30 degrees), the left display area and the right display area are smaller than the left display area and the right display area when the angle of view is set to the third angle of view C (35 degrees). When the angle of view of the virtual camera VC is the second angle of view, the shapes of the left display area and the right display area are substantially regular dodecagons, similar to when the angle of view of the virtual camera VC is the third angle of view C. Also, if the angle of view of the virtual camera VC is set to the second angle of view, the image for a left eye and the image for a right eye in each of which a part of the virtual space is enlarged have the same size and are axisymmetric to each other.

As described above, in the exemplary embodiment, a part of the virtual space is enlarged (zoomed in) by decreasing the angle of view of the virtual camera VC. When the angle of view of the virtual camera VC is smaller, the enlargement rate of the virtual space becomes higher, and the display areas of the image for a left eye and the image for a right eye become smaller. That is, when the angle of view of the virtual camera VC is smaller (a part of the virtual space is enlarged more), the outer peripheral portions of the image for a left eye and the image for a right eye are cut more greatly.

As shown in FIGS. 17 to 20, as a result of the above distortion correction, each of the image for a left eye and the image for a right eye is more greatly distorted at a position closer to the outer peripheral portion thereof, and, as described later, each of the image for a left eye and the image for a right eye looks more strange to the user at a position closer to the outer peripheral portion thereof. However, in the exemplary embodiment, since the outer peripheral portions of the image for a left eye and the image for a right eye are cut, the strange feeling of the user can be reduced, and thus the possibility of VR sickness can be reduced.

When the angle of view of the virtual camera VC is set to the first angle of view, the shapes of the image for a left eye and the image for a right eye are substantially circular, and, when the angle of view of the virtual camera VC is set to the third angle of view B to second angle of view, the shapes of the image for a left eye and the image for a right eye are substantially regular dodecagons. The shapes of the image for a left eye and the image for a right eye are considered to be substantially similar shapes when the angle of view of the virtual camera VC changes from the first angle of view to the second angle of view. Here, the shapes of the image for a left eye and the image for a right eye at time of zoom-in are not limited to substantially regular dodecagons. For example, the shapes of the image for a left eye and the image for a right eye at time of zoom-in may each be a substantially regular decagon, a substantially regular octagon, a substantially regular hexagon, or a substantially regular pentagon. That is, in the present specification, the term "substantially similar shape" is not limited to a completely same shape, but includes strictly different but similar shapes.

Here, when the angle of view of the virtual camera VC is changed from the first angle of view to the second angle of view, the sizes of the display areas of the image for a left eye and the image for a right eye may be made uniform without cutting the outer peripheral portions of the image for a left eye and the image for a right eye as described above. However, when the angle of view of the virtual camera VC is decreased while the sizes of the display areas of the image for a left eye and the image for a right eye are maintained, this may cause VR sickness.

Specifically, when a part of the virtual space is enlarged by decreasing the angles of view of the left virtual camera VCL and the right virtual camera VCR, the image may look optically incorrect, causing VR sickness. The reason for this is described below.

Figure 21A:
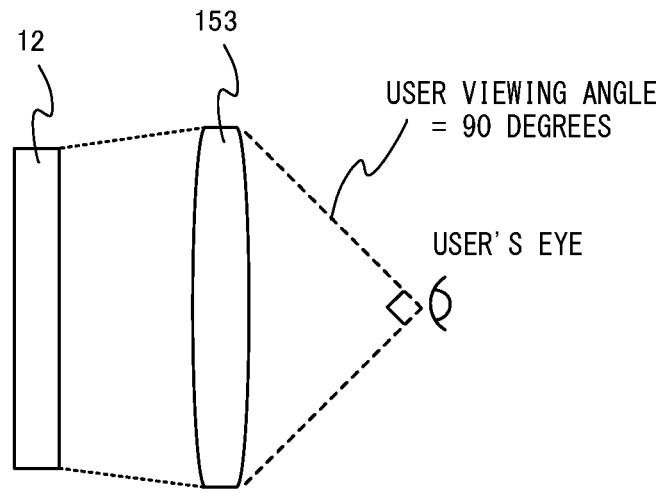
FIG. 21A is an example non-limiting diagram showing an example of the viewing angle of the user using a lens 153.
Figure 21B:
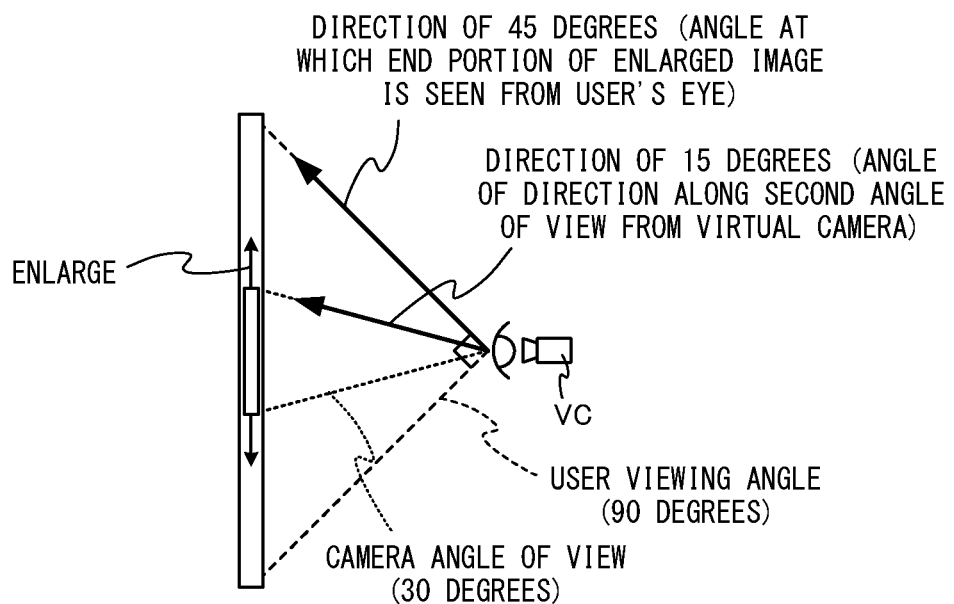
FIG. 21B is an example non-limiting diagram showing an example of a relationship between a direction along the angle of view of the virtual camera and the line-of-sight direction of the user when the angle of view of the virtual camera is changed to the second angle of view.

FIG. 21A is a diagram showing an example of the viewing angle of the user using the lens 153. FIG. 21B is a diagram showing an example of a relationship between the line-of-sight direction of the user and the direction along the angle of view of the virtual camera when the angle of view of the virtual camera is changed to the second angle of view.

As shown in FIG. 21A, with the image display system 100 according to the exemplary embodiment, when the user views the display 12 through the lens 153, the viewing angle of one eye of the user is adjusted to, for example, 90 degrees. For example, the viewing angle of one eye of the user is adjusted such that: in the right-left direction, the left end of the lens 153 is located in the direction of 45 degrees to the left from the eye position of the user, and the right end of the lens 153 is located in the direction of 45 degrees to the right from the eye position of the user; and, in the up-down direction, the upper end of the lens 153 is located in the direction of 45 degrees upward from the eye position of the user, and the lower end of the lens 153 is located in the direction of 45 degrees downward from the eye position of the user. The first angle of view of the virtual camera VC at normal time coincides with the viewing angle of the user using the lens 153. Since the viewing angle of one eye of a person is about 90 to 100 degrees, when the user views the display 12 of the goggles apparatus 150, most of the field of view is covered.

As shown in FIG. 21B, if the angle of view (viewing angle) of the virtual camera VC is set to, for example, 30 degrees, an image within a range of 30 degrees as seen from the virtual camera VC is enlarged and displayed on the display 12, and the user views the enlarged image. By enlarging the range of 30 degrees as seen from the virtual camera VC to a range with a field of view of 90 degrees, the image looks incorrect for the user.

Specifically, if the outer peripheral portions of the image for a left eye and the image for a right eye are not cut, for example, a virtual object or a line located in the direction of 15 degrees as seen from the virtual camera VC appears to be located in the direction of 45 degrees from the eyes of the user. That is, the angle (45 degrees) at which the end portions of the enlarged image for a left eye and the enlarged image for a right eye are seen from the viewpoint of the user wearing the goggles apparatus 150 is larger than the angle (15 degrees) at which the virtual space is seen from the virtual camera VC in the direction along the second angle of view. Therefore, the virtual space looks different from the actual one, and the user may feel strange. For example, a portion of an object that is visible when the object is actually located in the direction of 15 degrees from the user is different from a portion of the object that is visible when the object is actually located in the direction of 45 degrees from the user. For example, when an object is actually located in the direction of 15 degrees, a back-side part of the object can be seen, but, when an object is actually located in the direction of 45 degrees, the back-side part cannot be seen in some cases. Therefore, when the virtual space seen from the virtual camera VC at an angle of view of 30 degrees is enlarged to a range with a field of view of 90 degrees, the appearance of the object from the user is made different from the actual appearance. Such a difference in appearance is greater at a position closer to the outer peripheral portion of the lens 153. In addition, if the angle of view of the virtual camera VC coincides with the viewing angle of the user wearing the goggles apparatus 150 (the display angle of view of the goggles apparatus 150), when the virtual camera VC is rotated by a certain angle, a virtual object within the virtual space appears to move by the same angle. Meanwhile, if the angle of view of the virtual camera VC and the display angle of view of the goggles apparatus 150 are different from each other, when the virtual camera VC is rotated by a certain angle, the virtual object within the virtual space does not move by the same angle. For example, if the angle of view of the virtual camera VC is set to 30 degrees, when the user rotates their head rightward by 30 degrees, the object that has been in front of the user rotates rightward by 90 degrees. As described above, if the angle of view of the virtual camera VC is different from the display angle of view of the goggles apparatus 150, the virtual object looks unnatural for the user or moves unnaturally, which may cause VR sickness.

Moreover, for example, an image of the virtual space seen from the virtual camera VC may be generated, and distortion correction corresponding to the characteristics of the lens 153 may be performed in accordance with a position from the center of the generated image (a display position when displayed on the display 12). Since distortion correction corresponding to a position from the center of the image is performed, when the user views the image displayed on the display 12 through the lens 153, the distortion of the lens 153 and the distortion by the distortion correction are cancelled each other, and the image is viewed as a distortion-free image by the user. Thus, if the angle of view of the virtual camera VC is set to the first angle of view, and if the angle of view of the virtual camera VC is set to the second angle of view, the user basically views a distortion-free image. However, for example, the eye position or the eye interval of the user is not necessarily always uniform, the eye position of the user, the position of the lens 153, and the position of an image displayed on the display 12 may become slightly displaced. Due to the displacement of these positions, the distortion of the lens 153 and the distortion by the distortion correction do not coincide with each other in some cases. Since the distortion is greater at a position closer to the outer peripheral portion of the lens, the difference between the distortion of the lens 153 and the distortion by the distortion correction is also greater at a position closer to the outer peripheral portion. When enlargement is performed by setting the angle of view of the virtual camera VC to the second angle of view, an object is located across the outer peripheral portion of the image and looks distorted. Therefore, the difference between the appearance of the object and the actual appearance is increased, which may cause VR sickness.

When an image is enlarged by decreasing the angle of view of the virtual camera VC, the image looks stranger at a position closer to the outer peripheral portion, which may cause VR sickness. Therefore, in the exemplary embodiment, in order to reduce VR sickness, as shown in FIGS. 17 to 20, when a part of the virtual space is enlarged by decreasing the angle of view of the virtual camera VC, the outer peripheral portions of the image for a left eye and the image for a right eye are cut. Specifically, when the angle of view of the virtual camera VC is smaller, the sizes of the outer peripheral portions to be cut are made larger (in other words, the display areas of the image for a left eye and the image for a right eye are made smaller).

Accordingly, a part of the virtual space is enlarged, and VR sickness due to the enlargement can be reduced. Specifically, an image, of the virtual space, corresponding to the outer peripheral portion at which the difference from the actual appearance is great can be prevented from being viewed by the user, and strange feeling can be prevented from being provided to the user.

Moreover, since the outer peripheral portions of the image for a left eye and the image for a right eye are cut, the user is aware that a part of the virtual space is enlarged, and the user views the images with that awareness, and thus VR sickness can be unlikely to occur.

Moreover, in the exemplary embodiment, when an image is enlarged by decreasing the angle of view of the virtual camera VC, the inter-camera distance d is changed in accordance with the angle of view of the virtual camera VC. Specifically, when the angle of view of the virtual camera VC is smaller (the enlargement rate of the virtual space is higher), the inter-camera distance d is made smaller. Accordingly, VR sickness can be reduced. That is, when an image is enlarged by decreasing the angle of view of the virtual camera VC, the image looks optically incorrect as described above, and the stereoscopic effect of the image also becomes different from the real one. Thus, when an image is enlarged by decreasing the angle of view of the virtual camera VC, if the inter-camera distance d is made equal to that at normal time, the user feels a stereoscopic effect different from the real one, which may cause VR sickness. Therefore, in the exemplary embodiment, when an image is enlarged by decreasing the angle of view of the virtual camera VC, the inter-camera distance d is decreased (that is, the parallax between the image for a left eye and the image for a right eye is decreased). Accordingly, the stereoscopic effect is reduced, and thus VR sickness can be reduced.

Figure 22:
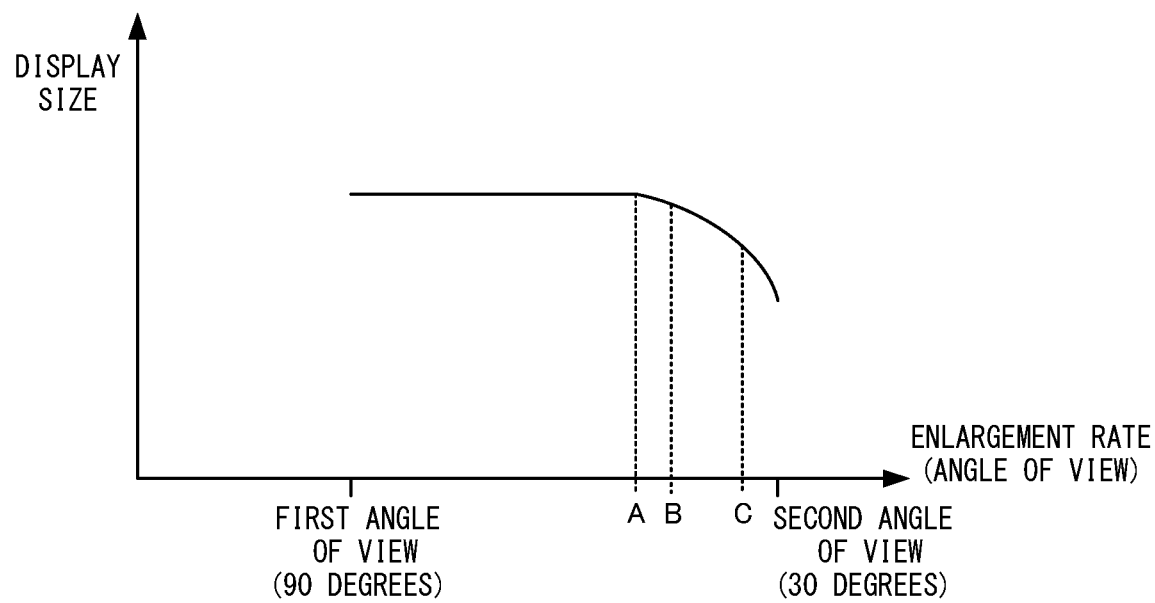
FIG. 22 is an example non-limiting diagram showing an example of a relationship between the angle of view of the virtual camera VC and the display size of an image for a left eye and an image for a right eye.
Figure 23:
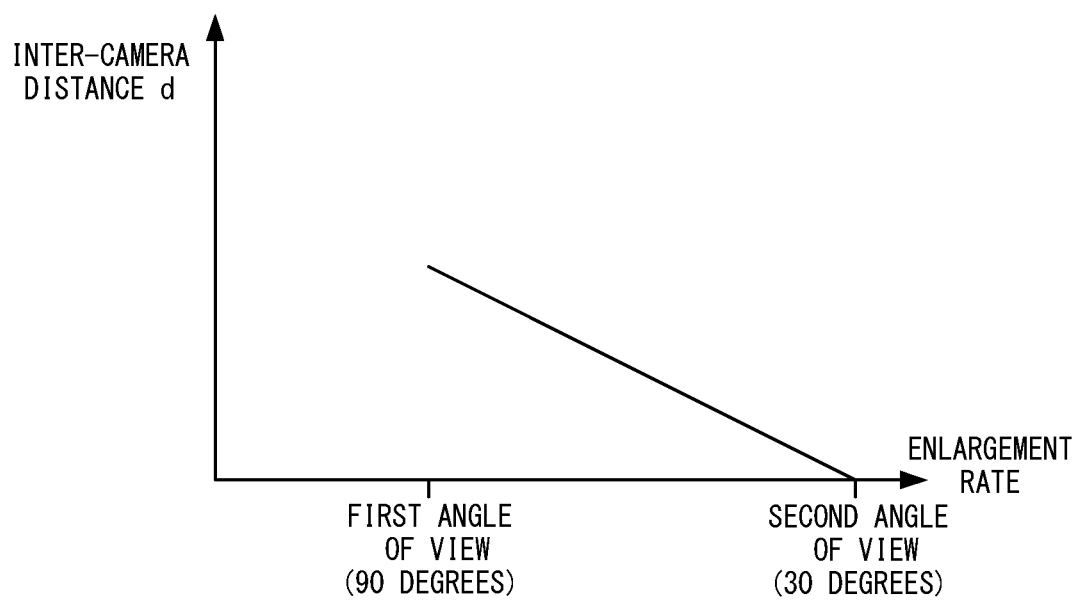
FIG. 23 is an example non-limiting diagram showing an example of a relationship between the angle of view of the virtual camera VC and an inter-camera distance d.

FIG. 22 is a diagram showing an example of a relationship between the angle of view of the virtual camera VC and the display sizes of the image for a left eye and the image for a right eye. FIG. 23 is a diagram showing an example of a relationship between the angle of view of the virtual camera VC and the inter-camera distance d. In FIGS. 22 and 23, the horizontal axis indicates enlargement rate (angle of view of the virtual camera VC), and the enlargement rate is higher toward the right side (the angle of view is smaller).

As shown in FIG. 22, when the angle of view of the virtual camera VC is from the first angle of view (for example, 90 degrees) to the third angle of view A, the sizes of the display areas of the image for a left eye and the image for a right eye are constant (see FIG. 17). When the angle of view of the virtual camera VC becomes smaller than the third angle of view A, the sizes of the display areas are decreased (see FIGS. 18 and 19). The smaller the angle of view of the virtual camera VC, the higher the decrease rate of the size of the display areas. For example, until the angle of view of the virtual camera VC reaches the third angle of view C, the sizes of the display areas relatively gradually decrease, and, when the angle of view of the virtual camera VC becomes smaller than the third angle of view C, the sizes of the display areas steeply decrease. Then, if the angle of view of the virtual camera VC is set to the second angle of view (for example, 30 degrees) which is the smallest, the display sizes become the smallest (see FIG. 20).

Moreover, as shown in FIG. 23, while the angle of view of the virtual camera VC changes from the first angle of view (for example, 90 degrees) to the second angle of view, the inter-camera distance d is decreased. For example, the inter-camera distance d is linearly decreased in accordance with a decrease in the angle of view (enlargement of an image), and, if the angle of view of the virtual camera VC is set to the second angle of view which is the smallest, the inter-camera distance d becomes "0".

Change in the inter-camera distance d is not limited to linear change, and the inter-camera distance d may be changed in a curve in accordance with change in the angle of view of the virtual camera VC (that is, the rate of increase/decrease in the inter-camera distance d may be changed while the angle of view of the virtual camera VC is changed).

(Hand Shake Correction at Time of Zoom-In)

Next, a hand shake correction function of the exemplary embodiment is described. In the exemplary embodiment, when a part of the virtual space is enlarged by decreasing the angle of view of the virtual camera VC, hand shake correction is performed. The hand shake correction is a function of reducing change in the orientation of the virtual camera VC due to hand shake. The hand shake correction is described below.

Figure 24:
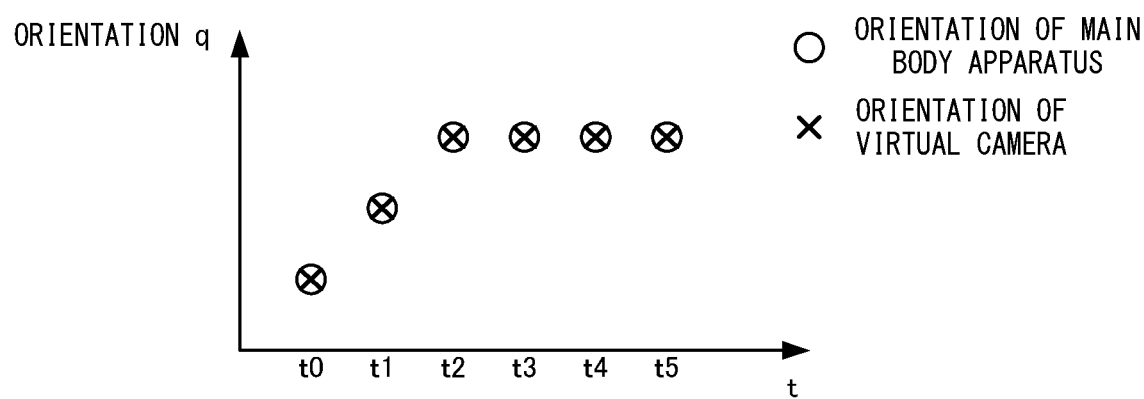
FIG. 24 is an example non-limiting diagram showing an example of change in the orientation of the main body apparatus 2 and change in the orientation of the virtual camera VC when hand shake correction is not performed.
Figure 25:
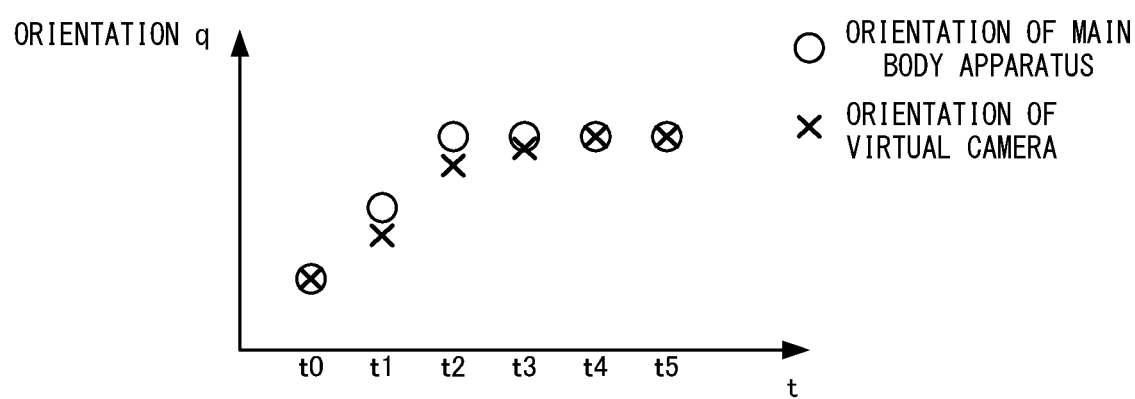
FIG. 25 is an example non-limiting diagram showing an example of change in the orientation of the main body apparatus 2 and change in the orientation of the virtual camera VC when hand shake correction is performed.

FIG. 24 is a diagram showing an example of change in the orientation of the main body apparatus 2 and change in the orientation of the virtual camera VC when hand shake correction is not performed. FIG. 25 is a diagram showing an example of change in the orientation of the main body apparatus 2 and change in the orientation of the virtual camera VC when hand shake correction is performed.

For example, in the exemplary embodiment, the orientations of the main body apparatus 2 and the virtual camera VC are represented by vectors. For example, the orientation of the main body apparatus 2 is represented by a quaternion q that has a component representing rotation in each of x-, y-, and z-axis directions and a component representing a rotation angle. In FIGS. 24 and 25, the horizontal axis indicates time, and the vertical axis indicates vector q representing orientation.

As shown in FIG. 24, if the orientation of the main body apparatus 2 changes from time t0 to time t5, the orientation of the virtual camera VC normally coincides with the orientation of the main body apparatus 2 at each time. That is, in the exemplary embodiment, if the angle of view of the virtual camera VC is set to the first angle of view, the hand shake correction is not performed. If the main body apparatus 2 detects a change in the orientation of the main body apparatus 2, the main body apparatus 2 changes the orientation of the virtual camera VC such that the orientation of the virtual camera VC coincides with the orientation of the main body apparatus 2. The main body apparatus 2 may calculate the orientation of the main body apparatus 2, for example, at a frequency of 200 Hz.

Meanwhile, as shown in FIG. 25, if the angle of view of the virtual camera VC is smaller than the first angle of view, the hand shake correction is performed. When the hand shake correction is performed, the orientation of the virtual camera VC changes so as to approach (follow) the orientation of the main body apparatus 2. If the orientation of the main body apparatus 2 changes, the orientation of the virtual camera VC changes over a predetermined time so as to coincide with the orientation of the main body apparatus 2. Thus, even if the orientation of the main body apparatus 2 rapidly changes, the orientation of the virtual camera VC does not rapidly change but changes over a certain time so as to approach the orientation of the main body apparatus 2. For example, the orientation of the virtual camera VC coincides with the orientation of the main body apparatus 2 at time t0, and, if the orientation of the main body apparatus 2 changes at time t1, the orientation of the virtual camera VC at time t1 does not completely coincide with the orientation of the main body apparatus 2. The orientation of the virtual camera VC changes by a change amount smaller than the change amount of the orientation of the main body apparatus 2. Furthermore, if the orientation of the main body apparatus 2 changes at time t2, the orientation of the virtual camera VC at time t2 does not completely coincide with the orientation of the main body apparatus 2 and changes so as to approach the orientation of the main body apparatus 2. Thereafter, if the orientation of the main body apparatus 2 at time t3 is the same as that at time t2, the orientation of the virtual camera VC at time t3 further approaches the orientation of the main body apparatus 2. Then, if the orientation of the main body apparatus 2 at time t4 is the same as that at time t2, the orientation of the virtual camera VC at time t4 coincides with the orientation of the main body apparatus 2.

In the exemplary embodiment, when the angle of view of the virtual camera VC is smaller (the enlargement rate of the virtual space is higher), a degree of the hand shake correction is higher. Here, the degree of the hand shake correction is a value indicating how much a change in the orientation of the virtual camera VC is delayed with respect to a change in the orientation of the main body apparatus 2. The lower the degree of the hand shake correction, the faster the orientation of the virtual camera VC approaches the orientation of the main body apparatus 2, and, the higher the degree of the hand shake correction, the more slowly the orientation of the virtual camera VC approaches the orientation of the main body apparatus 2. For example, if the angle of view of the virtual camera VC is set to the third angle of view A (first angle of view<third angle of view A<second angle of view), when the main body apparatus 2 detects a change in the orientation of the main body apparatus 2, the main body apparatus 2 may set the orientation of the virtual camera VC to 90% of the orientation of the main body apparatus 2. In addition, if the angle of view of the virtual camera VC is set to the second angle of view, when the main body apparatus 2 detects a change in the orientation of the main body apparatus 2, the main body apparatus 2 may set the orientation of the virtual camera VC to 80% of the orientation of the main body apparatus 2. If the angle of view of the virtual camera VC is set to the first angle of view, the degree of the correction becomes "0", and, when the main body apparatus 2 detects a change in the orientation of the main body apparatus 2, the main body apparatus 2 sets the orientation of the virtual camera VC to 100% of the orientation of the main body apparatus 2.

Normally, in VR, when movement of the virtual camera is not caused to coincide with movement of the user (movement of the goggles apparatus 150 or the like) and the orientation of the virtual camera is corrected, real movement of the user does not coincide with movement of an image within a VR space that the user sees, which may cause VR sickness. Thus, in the VR field, normally, movement of the user and movement of the virtual camera are caused to coincide with each other. However, the image display system 100 according to the exemplary embodiment provides a function of enlarging a part of the VR space, by narrowing the angle of view of the virtual camera VC. When the angle of view of the virtual camera VC is narrowed, if the orientation of the virtual camera VC is changed so as to coincide with a change in the orientation of the goggles apparatus 150, the VR space shakes due to slight hand movement (hand shake), which may cause VR sickness. Therefore, in the exemplary embodiment, when the angle of view of the virtual camera VC is narrowed, the influence of hand shake is reduced by the hand shake correction. Accordingly, even when a part of the virtual space is enlarged by narrowing the angle of view of the virtual camera VC, VR sickness can be reduced.

The method for making the orientation of the virtual camera approach the orientation of the main body apparatus 2 is not limited to the above method. For example, the orientation of the virtual camera VC may be set on the basis of an orientation (for example, weighted mean) calculated from the latest orientation of the main body apparatus 2 and the immediately previous orientation of the main body apparatus 2.

Moreover, as another method of the hand shake correction, if a change in the orientation of the main body apparatus 2 is equal to or less than a predetermined threshold, the orientation of the virtual camera VC may not be changed, and, if a change in the orientation of the main body apparatus 2 exceeds the predetermined threshold, the orientation of the virtual camera VC may be changed. In this case, the predetermined threshold may be made higher when the angle of view of the virtual camera VC is smaller. For example, if the angle of view of the virtual camera VC is the first angle of view, the predetermined threshold may be set to "0", and, if the angle of view of the virtual camera VC is the second angle of view, the predetermined threshold may be set to a value higher than "0".

With either method of the hand shake correction, if the angle of view of the virtual camera VC is the first angle of view, the hand shake correction may not be performed, and, when the orientation of the main body apparatus 2 changes, the orientation of the virtual camera VC may be set in accordance with the orientation of the main body apparatus 2 after the change. Meanwhile, if the angle of view of the virtual camera VC is the second angle of view, when the orientation of the main body apparatus 2 changes, hand shake correction for reducing change in the orientation of the virtual camera VC may be performed, and the orientation of the virtual camera VC may be set in accordance with the result of the hand shake correction.

As described above, in the exemplary embodiment, an image for a left eye and an image for a right eye in each of which a part of the virtual space is enlarged are generated by decreasing the angle of view of the virtual camera VC, and parts of the display areas of the enlarged image for a left eye and the enlarged image for a right eye are cut. Since the outer peripheral portions of the enlarged image for a left eye and the enlarged image for a right eye are cut, a portion at which the difference from the actual appearance is great can be prevented from being viewed by the user, and thus VR sickness can be reduced. In addition, by continuously decreasing the sizes of the display areas of the image for a left eye and the image for a right eye in accordance with continuous enlargement of a part of the virtual space, strange feeling can be prevented from being provided to the user, and a rapid change in display of the virtual space can be prevented from occurring. Accordingly, the possibility of VR sickness can be reduced. In addition, the user is allowed to be aware that a part of the virtual space is enlarged, and is allowed to view the images with that awareness, and thus VR sickness can be unlikely to occur. Therefore, a part of the VR space can be enlarged, and VR sickness can be reduced.

Moreover, in the exemplary embodiment, when a part of the virtual space is enlarged by decreasing the angle of view of the virtual camera VC, the distance between the left virtual camera VCL and the right virtual camera VCR is shortened. Accordingly, the stereoscopic effect can be reduced, and thus VR sickness can be reduced. In addition, by continuously decreasing the inter-camera distance d in accordance with continuous enlargement of a part of the virtual space, a rapid change in the stereoscopic effect can be prevented from occurring, and strange feeling can be prevented from being provided to the user. Accordingly, the possibility of VR sickness can be reduced.

Moreover, in the exemplary embodiment, when a part of the virtual space is enlarged, the hand shake correction is performed. Accordingly, for example, shake of the VR space due to hand shake can be reduced, and thus VR sickness can be reduced. Meanwhile, by not performing the hand shake correction at normal time, the orientation of the virtual camera VC can be controlled in accordance with a change in the orientation of the main body apparatus 2. Accordingly, movement of the user and movement of the virtual camera VC can be caused to coincide with each other, and thus the possibility of VR sickness can be reduced.

Moreover, in the exemplary embodiment, a part of the virtual space is enlarged by rotating the tubular portion 205, which imitates a telephoto zoom lens for a real camera, in the roll direction. Such an operation is closer to an operation on a real camera than, for example, when the user holds the controller and presses an operation button, tilts the analog stick, or changes the orientation of the controller. By enlarging the virtual space through such an operation close to an operation on a real camera, a sense of operating a real camera can be provided to the user, and thus VR sickness can be reduced.

When a part of the virtual space is enlarged, the virtual camera VC may be moved (caused to approach an object to be enlarged) within the virtual space instead of decreasing the angle of view of the virtual camera VC. In this case, if another virtual object is present on a movement path of the virtual camera VC, there is a possibility that the virtual camera VC slips through or collides against the other virtual object. In addition, even when the user has not actually moved, the user may visually feel that the user moves. Thus, the user feels strange, which may cause VR sickness.

When a part of the virtual space is enlarged, the virtual camera VC may not be moved, and a virtual object and a background may be caused to approach the virtual camera VC. In this case as well, the virtual space itself moves, and thus VR sickness may be caused.

However, in the exemplary embodiment, when a part of the virtual space is enlarged, the virtual camera VC or the virtual space itself is not moved, and the angle of view of the virtual camera VC is decreased. Thus, a problem due to such movement of the virtual camera VC or the virtual space does not arise.

(Details of Process)

Next, an example of a process performed in the main body apparatus 2 is specifically described. First, data stored in the main body apparatus 2 is described.

Figure 26:
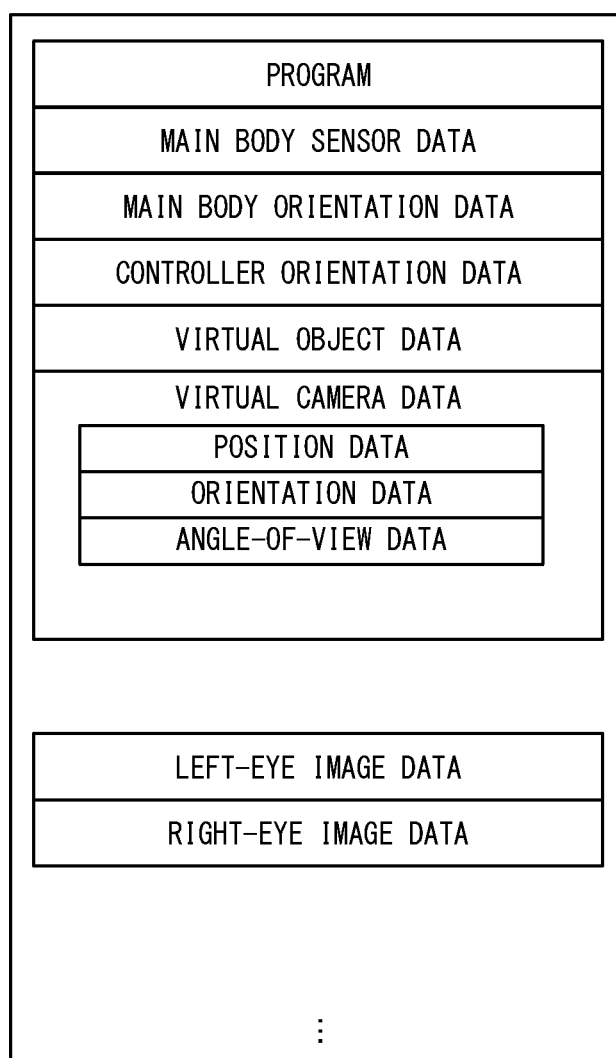
FIG. 26 is an example non-limiting diagram showing an example of data stored in a memory (mainly a DRAM 85) of the main body apparatus 2

FIG. 26 is a diagram showing an example of data stored in the memory (mainly the DRAM 85) of the main body apparatus 2. As shown in FIG. 26, a predetermined program, main body sensor data, main body orientation data, controller orientation data, virtual object data, virtual camera data, left-eye image data, and right-eye image data are stored in the memory of the main body apparatus 2. In addition to them, various data are stored in the main body apparatus 2.

The predetermined program is a program for performing a process by later-described flowcharts. The predetermined program is stored in, for example, the flash memory 84 or a memory card inserted into the slot 23, and is loaded to the DRAM 85 when the process is started. The predetermined program may be acquired from another apparatus through a network (for example, a LAN, a WAN, the internet, or the like).

The main body sensor data is data output from the acceleration sensor 89 and the angular velocity sensor 90 of the main body apparatus 2, and includes data about acceleration and data about angular velocity. The main body sensor data is output from the acceleration sensor 89 and the angular velocity sensor 90 at predetermined time intervals (for example, intervals of $\frac{1}{800}$ seconds) and stored in the memory.

The main body orientation data is data that is calculated on the basis of the main body sensor data (the data about acceleration and/or the data about angular velocity) and that indicates the orientation of the main body apparatus 2. For example, the main body apparatus 2 calculates a vector representing the orientation of the main body apparatus 2, on the basis of an angular velocity value from the angular velocity sensor 90, and stores the vector as the main body orientation data in the memory. In addition, the main body orientation data is calculated at predetermined time intervals (for example, intervals of $\frac{1}{200}$ seconds).

The controller orientation data is data about the orientation of the controller (the left controller 3 and the right controller 4). The main body apparatus 2 acquires controller orientation data from each controller at predetermined time intervals (for example, intervals of $\frac{1}{200}$ seconds) and stores the acquired controller orientation data in the memory. The main body apparatus 2 may acquire an angular velocity value and/or an acceleration value detected by the inertial sensor (the angular velocity sensor and the acceleration sensor) of each controller, as the controller orientation data from each controller. Alternatively, each controller may calculate the orientation of the controller on the basis of an angular velocity value and/or an acceleration value and transmit data about the calculated orientation to the main body apparatus 2.

The virtual object data is data about various virtual objects to be disposed in the virtual space, and includes data of the position, the shape, etc., of each virtual object.

The virtual camera data is data about the left virtual camera VCL and the right virtual camera VCR. The virtual camera data includes data indicating the position of each virtual camera VC, data indicating the orientation of each virtual camera VC, and data indicating the angle of view of each virtual camera VC.

The left-eye image data is data about an image of the virtual space generated on the basis of the left virtual camera VCL and is data about an image for a left eye to be displayed in the left display area of the display 12. The right-eye image data is data about an image of the virtual space generated on the basis of the right virtual camera VCR and is data about an image for a right eye to be displayed in the right display area of the display 12.

(Description of Flowcharts)

Figure 27:
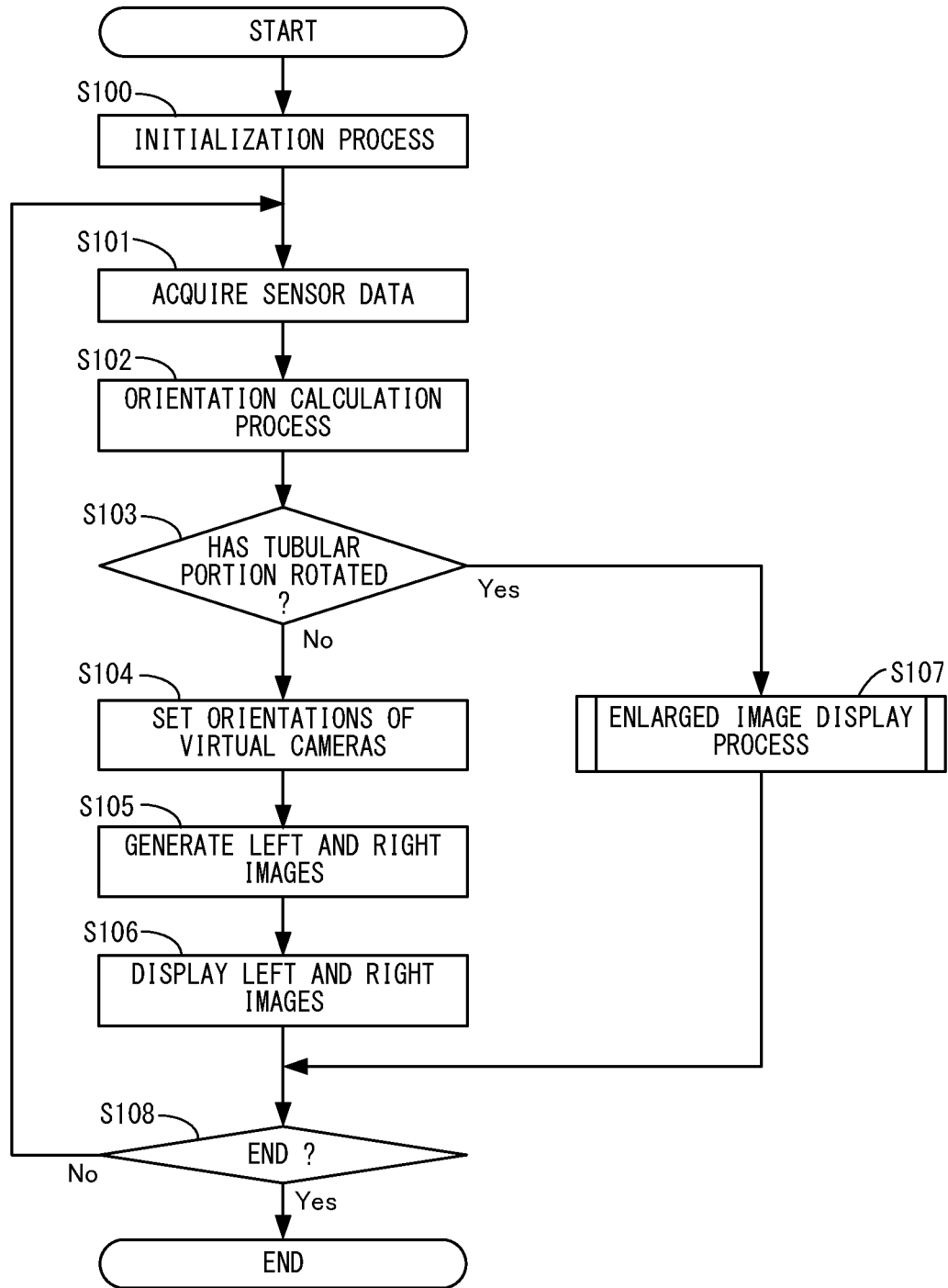
FIG. 27 is an example non-limiting flowchart showing an example of a process performed in a processor 81 of the main body apparatus 2.

Next, the details of the process performed in the main body apparatus 2 are described. FIG. 27 is a flowchart showing an example of a process performed in the processor 81 of the main body apparatus 2. In FIG. 27, only the above-described process is shown, and other processes (for example, game processing corresponding to a motion of the user performed in the virtual space) are omitted.

As shown in FIG. 27, first, the processor 81 performs an initialization process (step S100). In the initialization process, first, initialization regarding the orientation of the image display system 100 (main body apparatus 2) is performed. For example, in the initialization process, an instruction to place the image display system 100 including the main body apparatus 2 on a table or the like is given to the user, and the orientation of the main body apparatus 2 is initialized. In addition, in the initialization process, an XYZ coordinate system is set in the virtual space, and virtual objects, the left virtual camera VCL, the right virtual camera VCR, etc., are disposed within the virtual space. After the process in step S100, the processor 81 repeatedly performs processes in step S101 and subsequent steps every predetermined frame time (for example, 1/60 seconds).

After the process in step S100, the processor 81 acquires the main body sensor data (step S101). In addition, in step S101, the processor 81 acquires the controller orientation data.

Next, the processor 81 calculates the orientation of the main body apparatus 2 on the basis of the main body sensor data acquired in step S101 (step S102). Specifically, the processor 81 integrates the latest angular velocity value output by the angular velocity sensor 90 to calculate an orientation, thereby acquiring the orientation of the main body apparatus 2 (goggles apparatus 150). The acquired orientation of the main body apparatus 2 is stored as the main body orientation data in the memory.

Subsequently, the processor 81 determines whether the tubular portion 205 of the camera apparatus 200 has rotated in the roll direction (step S103). Specifically, on the basis of the controller orientation data acquired in step S101, the processor 81 determines whether the left controller 3 (or the right controller 4) provided within the tubular portion 205 has rotated about the y-axis.

If the processor 81 determines that the tubular portion 205 (left controller 3) has not rotated (step S103: NO), the processor 81 sets the orientation of the virtual camera VC in accordance with the orientation of the main body apparatus 2 acquired (calculated) in step S102 (step S104). Specifically, the processor 81 sets the orientations of the left virtual camera VCL and the right virtual camera VCR such that the orientations of the left virtual camera VCL and the right virtual camera VCR coincide with the orientation of the main body apparatus 2, and stores the set orientations as the orientation data of the virtual camera data in the memory. If the tubular portion 205 has not rotated, the processor 81 sets the positions of the left virtual camera VCL and the right virtual camera VCR such that the inter-camera distance d is a predetermined value (for example, the interval between the left and right eyes of an average person), and stores the set positions as the position data of the virtual camera data in the memory. In addition, if the tubular portion 205 has not rotated, the processor 81 sets the angles of view of the left virtual camera VCL and the right virtual camera VCR to the first angle of view (for example, 90 degrees), and stores the set angles of view as the angle-of-view data of the virtual camera data in the memory.

Next, the processor 81 generates an image for a left eye and an image for a right eye on the basis of the left virtual camera VCL and the right virtual camera VCR (step S105). Here, the angle of view of the virtual camera VC is set to the first angle of view, and a substantially circular image, of the virtual space, with a normal size (an image for a left eye and an image for a right eye) is generated. In addition, in step S105, the processor 81 performs distortion correction corresponding to the characteristics of the lens 153. Accordingly, an image for a left eye and an image for a right eye on which the distortion correction has been performed are generated.

Subsequent to step S105, the processor 81 displays the image for a left eye and the image for a right eye generated in step S105, on the display 12 (step S106). Accordingly, the image for a left eye and the image for a right eye of the virtual space are displayed in the left display area and the right display area of the display 12, respectively. A black image is displayed in the non-viewing area.

On the other hand, if the processor 81 determines that the tubular portion 205 has rotated (step S103: YES), the processor 81 performs an enlarged image display process (step S107). The enlarged image display process in step S107 is described later.

When the process in step S106 is performed, or when the process in step S107 is performed, the processor 81 determines whether to end the process shown in FIG. 27 (step S108). For example, in the case where a game is performed within the VR space, when the game is cleared, or when an instruction to end the game is made by the user, the processor 81 determines to end the process shown in FIG. 27. If the processor 81 determines NO in step S108, the processor 81 performs the process in step S101 again.

(Enlarged Image Display Process)

Next, the details of the enlarged image display process in step S107 are described. FIG. 28 is a flowchart showing an example of the enlarged image display process in step S107.

As shown in FIG. 28, the processor 81 sets the angle of view of the virtual camera VC (step S121). Specifically, the processor 81 sets the angles of view of the left virtual camera VCL and the right virtual camera VCR in accordance with the rotation angle of the left controller 3 (tubular portion 205) about the y-axis.

Next, the processor 81 enables the hand shake correction function (step S122). Specifically, the processor 81 sets a degree of hand shake correction corresponding to the angle of view set in step S121, and enables the hand shake correction function. The processor 81 sets a degree of correction such that the degree of hand shake correction is higher when the angle of view of the virtual camera VC is smaller (that is, the enlargement rate is higher).

Subsequent to step S122, the processor 81 sets the orientation of the virtual camera VC on the basis of the orientation of the main body apparatus 2 acquired (calculated) in step S102 (step S123). Specifically, the processor 81 sets the orientations of the left virtual camera VCL and the right virtual camera VCR in accordance with the degree of hand shake correction set in step S122 such that the orientations of the left virtual camera VCL and the right virtual camera VCR approach the orientation of the main body apparatus 2. Accordingly, when the angle of view of the virtual camera VC is smaller (the enlargement rate is higher), the orientation of the virtual camera VC more slowly approaches the orientation of the main body apparatus 2.

Next, the processor 81 sets the inter-camera distance d in accordance with the angle of view set in step S121 (step S124).

Subsequently, the processor 81 generates an image for a left eye and an image for a right eye in each of which a part of the virtual space is enlarged, on the basis of the left virtual camera VCL and the right virtual camera VCR (step S125). Here, an image for a left eye and an image for a right eye each of which has a normal size and in each of which a part of the virtual space is enlarged are generated. In addition, in step S125, the processor 81 performs distortion correction corresponding to the characteristics of the lens 153. Accordingly, an image for a left eye and an image for a right eye on which the distortion correction has been performed are generated. The distortion correction in step S125 is the same process as the above-described distortion correction in step S105.

Subsequent to step S125, the processor 81 determines whether the angle of view of the virtual camera VC set in step S121 is equal to or less than a predetermined value (the third angle of view A in FIG. 22) (step S126). In step S126, the processor 81 may determine whether the angle of view of the virtual camera VC is less than the predetermined value.

If the processor 81 determines that the angle of view of the virtual camera VC is equal to or less than the predetermined value (step S126: YES), the processor 81 reduces the left and right display areas in accordance with the angle of view of the virtual camera VC (step S127). For example, the processor 81 fills the outer peripheral portions of the images, of the virtual space, with a normal size (the image for a left eye and the image for a right eye) generated in the process in step S125, with black, thereby reducing the display areas of the images of the virtual space. The processor 81 makes the sizes of the display areas of the images of the virtual space smaller when the angle of view of the virtual camera VC is smaller.

Next, the processor 81 displays the image for a left eye and the image for a right eye on the display 12 (step S128). Accordingly, the image for a left eye and the image for a right eye that are cut at the outer peripheral portions thereof and in each of which a part of the virtual space is enlarged are displayed in the left display area and the right display area of the display 12, respectively. A black image is displayed in the non-viewing area.

On the other hand, if the angle of view of the virtual camera VC is not equal to or less than the predetermined value (step S126: NO), the processor 81 displays, on the display 12, the image for a left eye and the image for a right eye, with a normal size, generated in the process in step S125 (step S129). Here, a process of reducing the left and right image display areas as in step S127 is not performed. Accordingly, an image for a left eye and an image for a right eye that are images with the same size in step S106 and in each of which a part of the virtual space is enlarged are displayed. A black image is displayed in the non-viewing area.

When the process in step S128 is performed, or when the process in step S129 is performed, the processor 81 ends the process shown in FIG. 28 and returns the processing to FIG. 27. This is the end of the description of the flowcharts shown in FIGS. 27 and 28.

The processes shown in the above-described flowcharts are merely illustrative, and the order or contents of the processes may be changed as appropriate.

(Modifications)

Although the image display system according to the exemplary embodiment has been described above, the above embodiment is merely an example, and, for example, the following modifications may be made.

For example, in the above embodiment, an image for a left eye and an image for a right eye that have a parallax therebetween are generated on the basis of a pair of the left virtual camera VCL and the right virtual camera VCR. In another embodiment, an image may be generated on the basis of one virtual camera, and an image for a left eye and an image for a right eye that have a parallax therebetween may be generated by modifying the generated image. That is, in the present specification, "generating an image for a left eye and an image for a right eye on the basis of a virtual camera" includes both generating an image for a left eye and an image for a right eye on the basis of the pair of the left virtual camera VCL and the right virtual camera VCR and generating an image for a left eye and an image for a right eye on the basis of one virtual camera.

Also, in the case of generating an image for a left eye and an image for a right eye that have a parallax therebetween by not using left and right virtual cameras but using one virtual camera, an image for a left eye and an image for a right eye are generated such that a parallax at normal time is different from that at time of enlargement. Specifically, at normal time, an image for a left eye and an image for a right eye that have a first parallax are generated on the basis of one virtual camera, and, at time of enlargement, an image for a left eye and an image for a right eye that have a second parallax smaller than the first parallax are generated on the basis of one virtual camera.

In the above embodiment, substantially circular images are displayed as an image for a left eye and an image for a right eye at normal time, and images having shapes substantially similar to those at normal time (for example, images having substantially regular dodecagon shapes) are displayed at time of enlargement. The shapes of the image for a left eye and the image for a right eye are merely an example, and images having any other shapes may be displayed. For example, an image for a left eye and an image for a right eye that have polygonal shapes may be displayed at normal time, and an image for a left eye and an image for a right eye that are images having shapes similar to those at normal time and the display areas of which are smaller than those at normal time may be displayed at time of enlargement.

In the above embodiment, the outer peripheral portions of an image for a left eye and an image for a right eye in each of which a part of the virtual space is enlarged are cut by filling the outer peripheral portions with black, thereby reducing the display areas of the image for a left eye and the image for a right eye. In another embodiment, another method may be used as a method for reducing the display areas of an image for a left eye and an image for a right eye in each of which a part of the virtual space is enlarged. For example, images with a predetermined color may be displayed at the outer peripheral portions of the image for a left eye and the image for a right eye in each of which a part of the virtual space is enlarged, the outer peripheral portions may be made translucent, or the outer peripheral portions may be blurred, thereby causing images, of the virtual space, corresponding to the outer peripheral portions to be invisible or difficult to see. In addition, the outer peripheral portions of the image for a left eye and the image for a right eye in each of which a part of the virtual space is enlarged may be hidden. Moreover, for example, the display areas of the image for a left eye and the image for a right eye in each of which a part of the virtual space is enlarged may be reduced by disposing a shielding object that blocks a part of the field of view of the virtual camera VC (for example, a donut-shaped object that allows a central portion to be seen therethrough and that blocks an outer peripheral portion). When an image of the virtual space including such a shielding object is taken with the virtual camera, an image of a part in the central portion of the virtual space displayed at normal time is enlarged and displayed, and the outer peripheral portion is blocked by the shielding object, so that a portion of the virtual space displayed at normal time is not displayed (or is difficult for the user to see). The images (outer peripheral images) at the outer peripheral portions of the image for a left eye and the image for a right eye may be images obtained by making the virtual space translucent, may be images obtained by blurring the virtual space, may be images of shielding objects disposed in the virtual space, or may be images with a predetermined color not disposed in the virtual space. That is, an image for a left eye and an image for a right eye may be generated by any other method as long as a part of the virtual space displayed at normal time is enlarged and displayed and another portion of the virtual space displayed at normal time is displayed at time of enlargement such that the other portion is invisible or difficult to see.

In the above embodiment, if setting of enlargement and display is made (for example, in the case with the second angle of view), a predetermined image (an outer peripheral image, for example, a black image) is displayed at each of the outer peripheral portions of the image for a left eye and the image for a right eye in each of which a part of the virtual space is enlarged, and, if setting of enlargement and display is not made (in the case with the first angle of view), the predetermined image is not displayed at each of the outer peripheral portions of the image for a left eye and the image for a right eye. In another embodiment, even if setting of enlargement and display is not made, a predetermined image may be displayed at each of the outer peripheral portions of the image for a left eye and the image for a right eye. In this case, when setting of enlargement and display is not made, the predetermined image displayed at each outer peripheral portion may be smaller than that when setting of enlargement and display is made.

In the above embodiment, setting in which the angle of view of the virtual camera is smaller than the first angle of view which is at normal time (setting in which a part of the virtual space is enlarged and displayed as compared to that at normal time) is made by rotating the tubular portion 205. In another embodiment, setting in which a part of the virtual space is enlarged and displayed may be made by any other operation. For example, the enlargement rate of a part of the virtual space may be continuously changed by an operation on a button or the analog stick of the left controller 3 or the right controller 4. In this case, the inter-camera distance (the parallax between the image for a left eye and the image for a right eye) may be continuously changed in accordance with a change in the enlargement rate of a part of the virtual space. Moreover, zoom-up setting (that is, setting to the second angle of view) may be made by an operation on a button (or the analog stick) of the controller, and zoom-up cancel setting (that is, setting to the first angle of view) may be made by an operation on the same or another button (or the analog stick). In this case, the inter-camera distance (the parallax between the image for a left eye and the image for a right eye) may also be changed in accordance with zoom-up setting and zoom-up cancel setting.

In the present specification, "continuously changing" the angle of view of the virtual camera or the inter-camera distance (parallax) includes changing in a curve as shown in FIG. 22, and linearly changing as shown in FIG. 23.

In the above embodiment, a part of the virtual space is continuously enlarged by continuously changing the angle of view of the virtual camera VC from the first angle of view to the second angle of view. In another embodiment, the angle of view of the virtual camera VC may be set to the first angle of view or the second angle of view smaller than the first angle of view. That is, the angle of view of the virtual camera VC may be set to the first angle of view at normal time, and the angle of view of the virtual camera VC may be set to the second angle of view at time of enlargement. In this case, if the angle of view of the virtual camera VC is set to the second angle of view, the sizes of the display areas of the image for a left eye and the image for a right eye are made smaller than those when the angle of view of the virtual camera VC is set to the first angle of view.

In the above embodiment, if the angle of view of the virtual camera VC is set to the second angle of view, the inter-camera distance d is set to zero. That is, when the enlargement rate is at its maximum, the parallax between the image for a left eye and the image for a right eye is set to zero. In another embodiment, if the angle of view of the virtual camera VC is set to the second angle of view, the parallax between the image for a left eye and the image for a right eye may be set to substantially zero. Here, the state where the parallax is substantially zero includes the state where there is no parallax at all, and the state where there is a small parallax but the images look almost flat for the user.

In the above embodiment, a part of the virtual space is enlarged by decreasing the angle of view of the virtual camera VC. In another embodiment, a part of the virtual space may be enlarged by another method. In this case, the inter-camera distance d may be shortened in accordance with enlargement of a part of the virtual space. For example, images of the virtual space may be generated on the basis of the virtual camera VC that is set to the first angle of view, parts of the generated images may be cut out and enlarged, and the enlarged images may be displayed as an image for a left eye and an image for a right eye. In this case, the parallax between an image for a left eye and an image for a right eye in each of which a part of the virtual space is enlarged is made smaller than the parallax before the enlargement. Also, in the case of enlarging a part of the virtual space by the other method as described above, the enlargement rate of the virtual space may be continuously changed, and the parallax between the image for a left eye and the image for a right eye (for example, the inter-camera distance d) may be decreased in accordance with the enlargement rate.

In the above embodiment, the orientation of the goggles apparatus 150 (main body apparatus 2) is detected on the basis of data from the inertial sensor (the angular velocity sensor 90 and/or the acceleration sensor 89) included in the main body apparatus 2. In another embodiment, the orientation of the goggles apparatus 150 may be detected by another method. For example, the image display system 100 may include a camera that takes an image of the goggles apparatus 150 from the outside, and an image of the goggles apparatus 150 or a marker attached to the goggles apparatus 150 may be taken by the camera, and the orientation of the goggles apparatus 150 may be acquired on the basis of the taken image. Alternatively, the goggles apparatus 150 may include a camera, and the orientation of the goggles apparatus 150 may be acquired on the basis of a change of an image taken by the camera.

The configuration of the image display system 100 is not limited to the above-described configuration and may be another configuration. For example, the goggles apparatus 150 and the camera apparatus 200 may be configured to be integrated with each other such that the goggles apparatus 150 and the camera apparatus 200 are inseparable from each other. That is, in the above embodiment, the goggles apparatus 150 has the attachable/detachable tubular portion 205, but, in another embodiment, the goggles apparatus 150 may have a fixed tubular portion 205. For example, the tubular portion 205 may be provided at the back surface side of the goggles apparatus. Alternatively, the goggles apparatus may be an apparatus used in various states, such as a type of apparatus that is fitted to the face of the user by the user holding the apparatus, a type of apparatus that is fitted to the face of the user by being fixed to the head of the user, and a type of apparatus into which the user looks when the apparatus is in a placed state. Still alternatively, the goggles apparatus included in the image display system may be an apparatus that functions as a so called head-mounted display when being worn on the head of the user in the state where the main body apparatus 2 is attached to the apparatus, or may be an apparatus having a helmet shape other than a google shape.

In the above configuration, the goggles apparatus and the main body apparatus 2 are attachable to/detachable from each other. However, in another configuration, the goggles apparatus and the main body apparatus 2 may be configured as a single unit. That is, the goggles apparatus may be provided with a display for displaying an image for a left eye and an image for a right eye and a processor for generating images.

In the above configuration, the display 12 of the goggles apparatus 150 is attachable to/detachable from the goggles apparatus 150. In another embodiment, the display section of the goggles apparatus may be fixed to the goggles apparatus. In addition, the display section of the goggles apparatus is not limited to the above-described rectangular display 12. For example, the display section of the goggles apparatus may include two display sections (a left-eye display section viewed by the left eye of the user and a right-eye display section viewed by the right eye of the user). Alternatively, the display section of the goggles apparatus may have any shape. For example, the display section of the goggles apparatus itself may be formed in a substantially circular shape (a circular or elliptical shape). Still alternatively, two left and right display sections formed in a square or rectangular shape may be used as the display section of the goggles apparatus. Still alternatively, the display section of the goggles apparatus may be a display device such as a liquid crystal display device or an organic EL display device, or may be a projection type display device that projects an image onto a projection surface.

The configuration of the image display system 100 according to the above embodiment is merely an example and is not limited to the above configuration. For example, in the above embodiment, the goggles apparatus includes the goggles main body and the main body apparatus 2 including the display 12 for displaying an image and the processor 81 for performing a process for generating an image. That is, the image display system 100 is configured by the goggles apparatus including the goggles main body and the main body apparatus 2. In another embodiment, a goggles apparatus including a display section, and an information processing apparatus for performing, for example, a process for generating an image may be configured as separate apparatuses, and the image display system 100 may be configured by these apparatuses. In this case, the goggles apparatus and the information processing apparatus may be connected to each other via a wire or wirelessly, and an image for a left eye and an image for a right eye generated in the information processing apparatus may be transmitted to the goggles apparatus and viewed by the user. Alternatively, the information processing apparatus may perform the above-described process and transmit the result of the process to the goggles apparatus, and the goggles apparatus may generate an image for a left eye and an image for a right eye and cause the user to view the image for a left eye and the image for a right eye. Still alternatively, the goggles apparatus and the information processing apparatus may be connected to each other via a network (a LAN, a WAN, the internet, or the like).

In the above embodiment, the goggles apparatus including a display section into which the user looks while holding the goggles apparatus with their hands is used. In another embodiment, the goggles apparatus may be a head-mounted display that is fixedly worn on the head of the user.

Although the exemplary embodiment has been described above, the above description is merely an example of the exemplary embodiment, and various modifications and variations may be made.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:
1. An image display system, comprising:
a goggles apparatus; and
at least one processor, the at least one processor being configured to:
dispose a virtual camera in a virtual space;
dispose a virtual object in the virtual space;
set an angle of view of the virtual camera to at least either one of a first angle of view and a second angle of view smaller than the first angle of view;
generate an image for a left eye and an image for a right eye that are images of the virtual space included within the angle of view of the virtual camera and that have a parallax therebetween;
display the image for a left eye and the image for a right eye on a display section of the goggles apparatus;
generate a first image for a left eye and a first image for a right eye that include an image of the virtual object in the virtual space, if the angle of view of the virtual camera is set to the first angle of view, wherein the first image having a cutout portion having a first cutout size corresponding to the first angle of view;
generate a second image for a left eye and a second image for a right eye that include an enlarged image of the virtual object larger than the image of the virtual object included in the first image, if the angle of view of the virtual camera is set to the second angle of view, wherein the second image having the cutout portion having a second cutout size corresponding to the second angle of view;
display, in a display area with a first size, each of the first image for a left eye and the first image for a right eye that include the image of the virtual object, if the angle of view of the virtual camera is set to the first angle of view; and display, in a display area with a second size smaller than the first size, each of the second image for a left eye and the second image for a right eye that include the enlarged image of the virtual object, if the angle of view of the virtual camera is set to the second angle of view, and the image of the virtual object is enlarged, wherein the cutout portion changing from the first cutout size to the second cutout size as the angle of view changes from the first angle of view to the second angle of view.

2. The image display system according to claim 1, wherein the display area with the second size is an area that is a central portion obtained by removing at least an outer peripheral portion of the display area with the first size, and if the angle of view of the virtual camera is set to the second angle of view, the at least one processor displays, at the outer peripheral portion, an image in which the virtual space is invisible or difficult to see.

3. The image display system according to claim 1, wherein the at least one processor is capable of continuously changing the angle of view of the virtual camera from the first angle of view to the second angle of view, and the at least one processor continuously reduces display areas of an image for a left eye and an image for a right eye in each of which a part of the virtual space is enlarged, in accordance with continuous change in the angle of view of the virtual camera from the first angle of view to the second angle of view.

4. The image display system according to claim 1, wherein the at least one processor is capable of continuously changing the angle of view of the virtual camera from the first angle of view to the second angle of view, and in accordance with continuous change in the angle of view of the virtual camera from the first angle of view to the second angle of view, the at least one processor changes display areas of an image for a left eye and an image for a right eye in each of which a part of the virtual space is enlarged, into substantially similar shapes, and continuously reduces the display areas.

5. The image display system according to claim 1, wherein the at least one processor is capable of continuously changing the angle of view of the virtual camera from the first angle of view to the second angle of view, and in accordance with continuous change in the angle of view of the virtual camera from the first angle of view to the second angle of view, the at least one processor continuously reduces display areas of an image for a left eye and an image for a right eye in each of which a part of the virtual space is enlarged, while maintaining each of the display areas in a substantially circular or elliptical shape.

6. The image display system according to claim 1, further comprising a sensor for detecting an orientation of the goggles apparatus, wherein the at least one processor controls an orientation of the virtual camera on the basis of the orientation of the goggles apparatus, the at least one processor sets a degree of change in the orientation of the virtual camera with respect to a change in the orientation of the goggles apparatus, and if the angle of view of the virtual camera is set to the second angle of view, when the orientation of the goggles apparatus changes, the at least one processor controls the orientation of the virtual camera such that the orientation of the virtual camera approaches the orientation of the goggles apparatus by the set degree of change.

7. The image display system according to claim 6, wherein, if the angle of view of the virtual camera is set to the second angle of view, the at least one processor sets a degree of change in the orientation of the virtual camera with respect to a change in the orientation of the goggles apparatus such that the degree of change is lower than when the angle of view of the virtual camera is set to the first angle of view.

8. The image display system according to claim 1, further comprising a sensor for detecting an orientation of the goggles apparatus, wherein the at least one processor controls an orientation of the virtual camera on the basis of the orientation of the goggles apparatus, if the angle of view of the virtual camera is set to the first angle of view, when the orientation of the goggles apparatus changes, the at least one processor controls the orientation of the virtual camera in accordance with the orientation of the goggles apparatus after the change, and if the angle of view of the virtual camera is set to the second angle of view, when the orientation of the goggles apparatus changes, the at least one processor performs a correction process for reducing change in the orientation of the virtual camera and controls the orientation of the virtual camera in accordance with the correction process.

9. The image display system according to claim 1, wherein the at least one processor is capable of setting the angle of view of the virtual camera to a third angle of view that is smaller than the first angle of view and larger than the second angle of view, the at least one processor is capable of continuously changing the angle of view of the virtual camera from the first angle of view to the second angle of view, if the angle of view of the virtual camera is set in a range between the first angle of view and the third angle of view, the at least one processor displays, in the display area with the first size, each of an image for a left eye and an image for a right eye in each of which a part of the virtual space is enlarged, and if the angle of view of the virtual camera is set in a range between the third angle of view and the second angle of view, the at least one processor displays, in a display area smaller than the first size and larger than the second size, each of an image for a left eye and an image for a right eye in each of which a part of the virtual space is enlarged.

10. The image display system according to claim 1, wherein the goggles apparatus has a tubular portion rotatable in a roll direction, the image display system further comprises a sensor for detecting a rotation angle of the tubular portion, and the at least one processor sets the angle of view of the virtual camera in accordance with the rotation angle of the tubular portion.

11. The image display system according to claim 1, wherein,
if the angle of view of the virtual camera is set to the first angle of view, the at least one processor sets the parallax between the image for a left eye and the image for a right eye to a first parallax, and,
if the angle of view of the virtual camera is set to the second angle of view, the at least one processor sets a parallax between an image for a left eye and an image for a right eye in each of which a part of the virtual space is enlarged, to a second parallax smaller than the first parallax.

12. The image display system according to claim 11, wherein
the virtual camera includes a left-eye virtual camera for generating the image for a left eye and a right-eye virtual camera for generating the image for a right eye,
if the angle of view of the virtual camera is set to the first angle of view, the at least one processor sets a virtual distance between the left-eye virtual camera and the right-eye virtual camera to a first distance, and
if the angle of view of the virtual camera is set to the second angle of view, the at least one processor sets the virtual distance between the left-eye virtual camera and the right-eye virtual camera to a second distance shorter than the first distance.

13. The image display system according to claim 12, wherein
the at least one processor is capable of continuously changing the angle of view of the virtual camera from the first angle of view to the second angle of view, and
if the angle of view of the virtual camera continuously changes from the first angle of view to the second angle of view, the at least one processor continuously shortens the virtual distance between the left-eye virtual camera and the right-eye virtual camera.

14. The image display system according to claim 1, wherein an angle at which end portions of an image for a left eye and an image for a right eye in each of which a part of the virtual space is enlarged are seen from a viewpoint of a user wearing the goggles apparatus is larger than an angle at which the virtual space is seen from the virtual camera in a direction along the second angle of view.

15. A non-transitory storage medium having stored therein an image display program executed by a processor of an apparatus configured to display an image on a display section of a goggles apparatus, the image display program causing the processor to provide execution comprising:
disposing a virtual camera in a virtual space;
disposing a virtual object in the virtual space;
setting an angle of view of the virtual camera to at least either one of a first angle of view and a second angle of view smaller than the first angle of view;
generating an image for a left eye and an image for a right eye that are images of the virtual space included within the angle of view of the virtual camera and that have a parallax therebetween, in order to display the image for a left eye and the image for a right eye on the display section of the goggles apparatus;
generating a first image for a left eye and a first image for a right eye that are images including an image of the virtual object in the virtual space and that have a first size, if the angle of view of the virtual camera is set to the first angle of view, wherein the first image having a cutout portion having a first cutout size corresponding to the first angle of view; and
generating a second image for a left eye and a second image for a right eye that include an enlarged image of the virtual object larger than the image of the virtual object included in the first image and that have a second size smaller than the first size, if the angle of view of the virtual camera is set to the second angle of view, wherein the second image having the cutout portion having a second cutout size corresponding to the second angle of view, and wherein the cutout portion changing from the first cutout size to the second cutout size as the angle of view changes from the first angle of view to the second angle of view.

16. An image display apparatus configured to display an image on a display section of a goggles apparatus, the image display apparatus, comprising:
at least one processor; and
a memory configured to store computer readable instructions that, when executed, cause the at least one processor to:
dispose a virtual camera in a virtual space;
dispose a virtual object in the virtual space;
set an angle of view of the virtual camera to at least either one of a first angle of view and a second angle of view smaller than the first angle of view;
generate an image for a left eye and an image for a right eye that are images of the virtual space included within the angle of view of the virtual camera and that have a parallax therebetween;
display the image for a left eye and the image for a right eye on a display section of the goggles apparatus;
generate a first image for a left eye and a first image for a right eye that include an image of the virtual object in the virtual space, if the angle of view of the virtual camera is set to the first angle of view, wherein the first image having a cutout portion having a first cutout size corresponding to the first angle of view;
generate a second image for a left eye and a second image for a right eye that include an enlarged image of the virtual object larger than the image of the virtual object included in the first image, if the angle of view of the virtual camera is set to the second angle of view, wherein the second image having the cutout portion having a second cutout size corresponding to the second angle of view;
display, in a display area with a first size, each of the first image for a left eye and the first image for a right eye that include the image of the virtual object, if the angle of view of the virtual camera is set to the first angle of view; and
display, in a display area with a second size smaller than the first size, each of the second image for a left eye and the second image for a right eye that include the enlarged image of the virtual object, if the angle of view of the virtual camera is set to the second angle of view, and the image of the virtual object is enlarged, wherein the cutout portion changing from the first cutout size to the second cutout size as the angle of view changes from the first angle of view to the second angle of view.

17. An image display method executed in an image display system including a goggles apparatus, the image display method comprising:
disposing a virtual camera in a virtual space;
disposing a virtual object in the virtual space;

setting an angle of view of the virtual camera to at least either one of a first angle of view and a second angle of view smaller than the first angle of view;

generating an image for a left eye and an image for a right eye that are images of the virtual space included within the angle of view of the virtual camera and that have a parallax therebetween, in order to display the image for a left eye and the image for a right eye on the display section of the goggles apparatus;

generating a first image for a left eye and a first image for a right eye that include an image of the virtual object in the virtual space and that have a first size, if the angle of view of the virtual camera is set to the first angle of view, wherein the first image having a cutout portion having a first cutout size corresponding to the first angle of view; and generating a second image for a left eye and a second image for a right eye that that include an enlarged image of the virtual object larger than the image of the virtual object included in the first image and that have a second size smaller than the first size, if the angle of view of the virtual camera is set to the second angle of view, wherein the second image having the cutout portion having a second cutout size corresponding to the second angle of view, and wherein the cutout portion changing from the first cutout size to the second cutout size as the angle of view changes from the first angle of view to the second angle of view.

18. The image display system according to claim 1, wherein an inter-camera distance of the virtual camera and a parallax between the first image for the left eye and the first image for the right eye changes as the angle of view changes from the first angle of view to the second angle of view.

19. The non-transitory storage medium of claim 15, wherein the image display program further causing the processor to provide execution comprising:

displaying, in a display area with a first size, each of the first image for a left eye and the first image for a right eye that include the image of the virtual object, if the angle of view of the virtual camera is set to the first angle of view; and displaying, in a display area with a second size smaller than the first size, each of the second image for a left eye and the second image for a right eye that include the enlarged image of the virtual object, if the angle of view of the virtual camera is set to the second angle of view, and the image of the virtual object is enlarged.

20. The image display method of claim 17, further comprising:

displaying, in a display area with a first size, each of the first image for a left eye and the first image for a right eye that include the image of the virtual object, if the angle of view of the virtual camera is set to the first angle of view; and displaying, in a display area with a second size smaller than the first size, each of the second image for a left eye and the second image for a right eye that include the enlarged image of the virtual object, if the angle of view of the virtual camera is set to the second angle of view, and the image of the virtual object is enlarged.

\* \* \* \* \*